United States Patent
Sidhu et al.

(10) Patent No.: US 9,814,084 B2
(45) Date of Patent: *Nov. 7, 2017

(54) LOCATION AND PAIRING OF DEVICES ON A LOCAL AREA NETWORK USING A UNIQUE IDENTIFIER

(71) Applicant: Belkin International, Inc., Playa Vista, CA (US)

(72) Inventors: Gursharan Sidhu, Moorpark, CA (US); Ryan Yong Kim, Roling Hills Estates, CA (US); Venkata Subba Rao Pathuri, Alpharetta, GA (US); Naga Yerramsetti, Houston, TX (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/454,163

(22) Filed: Aug. 7, 2014

(65) Prior Publication Data

US 2016/0044719 A1 Feb. 11, 2016

(51) Int. Cl.
*H04W 76/02* (2009.01)
*H04L 29/08* (2006.01)
(Continued)

(52) U.S. Cl.
CPC .......... *H04W 76/02* (2013.01); *H04L 67/141* (2013.01); *H04W 4/00* (2013.01); *H04W 8/005* (2013.01);
(Continued)

(58) Field of Classification Search
CPC . H04L 63/1466; H04L 63/0823; H04L 63/10; H04L 2463/101; H04L 63/0876
(Continued)

(56) References Cited

U.S. PATENT DOCUMENTS 8,099,764 B2 * 1/2012 Herzog ............... H04L 12/5895
380/229
2013/0275957 A1 10/2013 Villar et al.
(Continued)

OTHER PUBLICATIONS

First Action Interview Pilot Program Pre-Interview Communication dated Feb. 11, 2016 for U.S. Appl. No. 14/946,290, 5 pages.
(Continued)

*Primary Examiner* — Charles C Jiang
*Assistant Examiner* — Will Lin
(74) *Attorney, Agent, or Firm* — Kilpatrick Townsend & Stockton LLP

(57) ABSTRACT

Exemplary embodiments of the present invention include a computer-implemented method, comprising: establishing, at a computing device on a network, a communication connection with a setup access point; generating a token identifier, wherein the token identifier includes identification data corresponding to the computing device; transmitting the token identifier; transmitting a query, wherein the query includes a request to establish a new communication connection with the setup access point when the communication connection is terminated; and receiving a communication including a response to the query, wherein the response indicates that a new communication connection has been established with the setup access point, and wherein the new communication connection is established using the token identifier.

30 Claims, 21 Drawing Sheets

(51) Int. Cl.
*H04W 8/00* (2009.01)
*H04W 68/00* (2009.01)
*H04W 4/00* (2009.01)
*H04W 4/02* (2009.01)
*H04W 84/12* (2009.01)
*H04W 4/06* (2009.01)

(52) U.S. Cl.
CPC ......... *H04W 68/00* (2013.01); *H04W 76/021* (2013.01); *H04W 76/023* (2013.01); *H04W 4/005* (2013.01); *H04W 4/008* (2013.01); *H04W 4/02* (2013.01); *H04W 4/06* (2013.01); *H04W 84/12* (2013.01)

(58) Field of Classification Search
USPC ......................................................... 726/4, 5
See application file for complete search history.

(56) References Cited

U.S. PATENT DOCUMENTS

| | | | | |
|---|---|---|---|---|
| 2013/0309971 | A1* | 11/2013 | Kiukkonen | H04L 63/107 455/41.2 |
| 2014/0029570 | A1* | 1/2014 | Lee | H04W 36/0005 370/331 |
| 2014/0098247 | A1* | 4/2014 | Rao | H04W 4/20 348/207.1 |
| 2014/0167931 | A1* | 6/2014 | Lee | G08C 17/02 340/12.5 |
| 2014/0171116 | A1* | 6/2014 | Lamarca | H04W 4/02 455/456.3 |
| 2014/0317242 | A1* | 10/2014 | Koo | H04W 4/001 709/219 |
| 2014/0355588 | A1* | 12/2014 | Cho | H04L 12/2816 370/338 |
| 2015/0029880 | A1 | 1/2015 | Burns et al. | |
| 2015/0257022 | A1* | 9/2015 | Kohlmann | H04W 24/08 455/550.1 |
| 2015/0327052 | A1* | 11/2015 | Ghai | H04W 8/18 370/328 |
| 2015/0327063 | A1 | 11/2015 | Van et al. | |
| 2015/0347114 | A1* | 12/2015 | Yoon | G06F 8/61 235/375 |
| 2016/0036908 | A1* | 2/2016 | Aggarwal | H04L 67/1065 370/254 |
| 2016/0087933 | A1* | 3/2016 | Johnson | H04W 4/001 709/245 |

OTHER PUBLICATIONS

Non-Final Office Action dated May 24, 2017, for U.S. Appl. No. 14/946,290, 31 pages.

\* cited by examiner

United States Patent US 9,814,084 B2

LOCATION AND PAIRING OF DEVICES ON A LOCAL AREA NETWORK USING A UNIQUE IDENTIFIER

FIELD

The present disclosure relates to establishing network connections of devices on a local area network. Specifically, various techniques and systems are provided for locating and pairing of devices on a local area network using a unique identifier.

BRIEF SUMMARY

Exemplary embodiments of the present invention include a computer-implemented method, comprising: establishing, at a computing device on a network, a communication connection with a setup access point; generating a token identifier, wherein the token identifier includes identification data corresponding to the computing device; transmitting the token identifier; transmitting a query, wherein the query includes a request to establish a new communication connection with the setup access point when the communication connection is terminated; and receiving a communication including a response to the query, wherein the response indicates that a new communication connection has been established with the setup access point, and wherein the new communication connection is established using the token identifier.

Alternative exemplary embodiments of the present invention include a computing device. The computing device comprises one or more processors and a memory having instructions stored thereon, which when executed by the one or more processors, cause the computing device to perform operations. The operations include: establishing, at a computing device on a network, a communication connection with a setup access point; generating a token identifier, wherein the token identifier includes identification data corresponding to the computing device; transmitting the token identifier; transmitting a query, wherein the query includes a request to establish a new communication connection with the setup access point when the communication connection is terminated; and receiving a communication including a response to the query, wherein the response indicates that a new communication connection has been established with the setup access point, and wherein the new communication connection is established using the token identifier.

Alternative exemplary embodiments of the present invention include a non-transitory computer-readable storage medium having instructions stored thereon, which when executed by a computing device, cause the computing device to: establish, at a computing device on a network, a communication connection with a setup access point; generate a token identifier, wherein the token identifier includes identification data corresponding to the computing device; transmit the token identifier; transmit a query, wherein the query includes a request to establish a new communication connection with the setup access point when the communication connection is terminated; and receive a communication including a response to the query, wherein the response indicates that a new communication connection has been established with the setup access point, and wherein the new communication connection is established using the token identifier.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
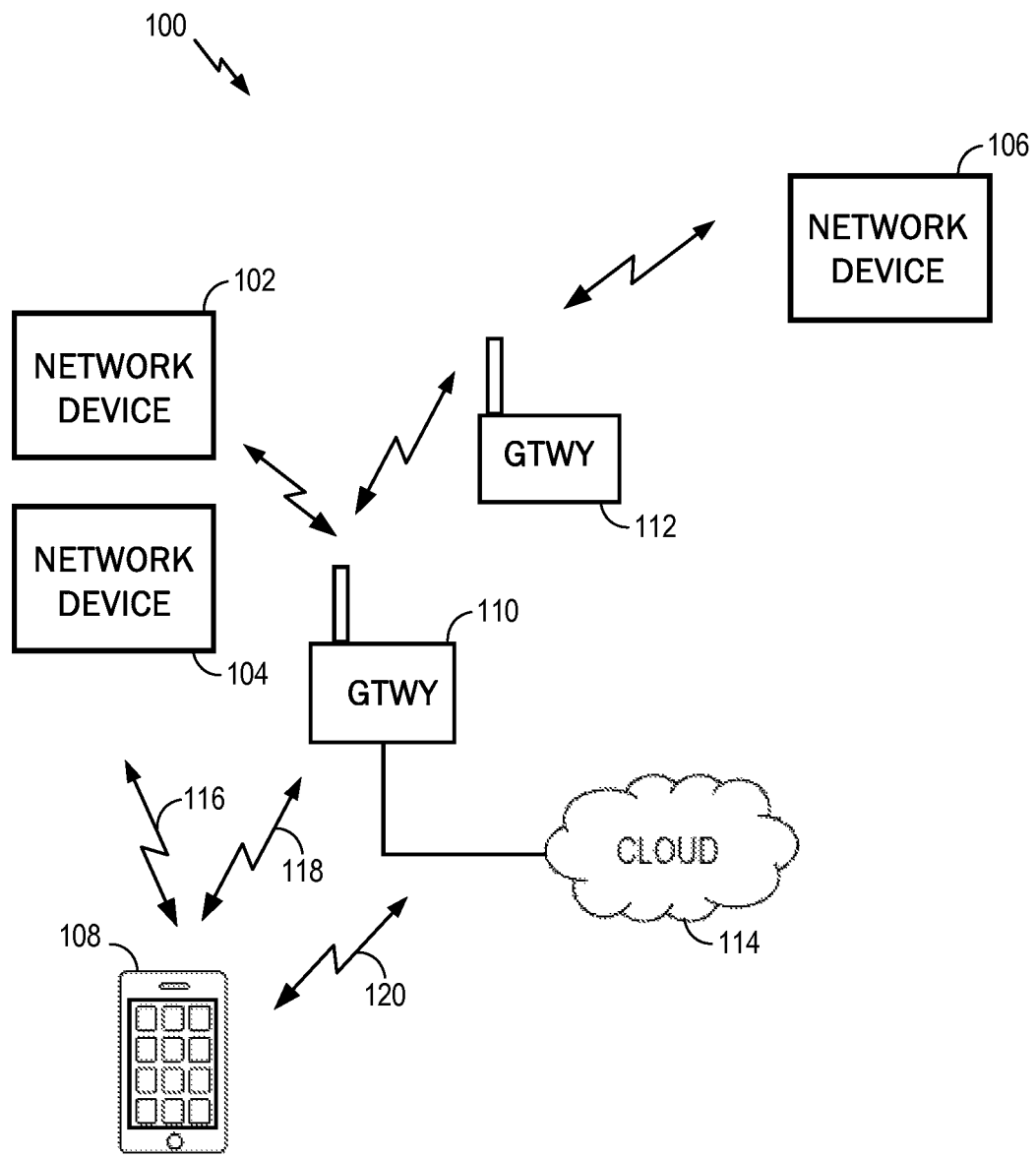
FIG. 1 is an illustration of an example of a wireless network environment in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A local area network may be set up to provide a user with access to various devices within the network. For example, a home automation network may include one or more network devices that provide a user with the ability to remotely configure or control one or more appliances within the user's home. The local area network may include one or more gateways that provide the user with access to the network devices. The one or more gateways may also provide the user and the network devices with access to one or more external networks, such as a cloud network, the Internet, and/or other wide area networks.

It is desirable for a user to be able to access the network devices while located within the local area network and also while located remotely from the local area network. For example, a user may access the network devices using an access device (e.g. mobile device, such as a smartphone) within the local area network or remotely from the local area network. As explained herein, a local area network may include multiple logical networks. In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, the access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

While remote, the user may access the network devices using an external network, such as a cloud network and/or the Internet. An accountless authentication process may also be performed when the user is remote so that the user can access network devices within the logical network without having to enter network device login credentials. For example, a cloud network server may provide a network ID and/or one or more keys to a network device and to an access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In one example, a home wireless local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can exchange communications with the server regarding the logical network.

In some embodiments, a local area network may include multiple gateways (e.g., a router and a range extender) and multiple network devices. For example, a local area network may include a first gateway paired with a first network device, and a second gateway paired with a second network device. A server (e.g., a cloud network server) may register the first gateway as a first logical network with a first network ID and may generate a first set of security keys for the first network device and an access device. The first set of security keys may include a unique security key for the first network device and a unique security key for the access device for use in accessing the first network device on the first logical network. The server may register the second gateway as a second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device. Accordingly, when multiple gateways are included in the home local area network, multiple logical networks (associated with different network identifiers) may be present within the local area network.

When the access device is located within range of the local area network (for example, one or all of its gateways), the access device may easily access network devices associated with both logical networks due to the ability of the access device to perform local discovery techniques (e.g., universal plug and play (UPnP)). In that situation, the access device may most efficiently transmit information with other devices using this most direct method. On the other hand, when the user is located remotely from the local area network, the access device may need to access those network devices via an external network, e.g. a cloud network, the Internet, and/or other wide area networks.

FIG. 1 illustrates an example of a wireless local area network 100. The local area network 100 includes network device 102, network device 104, and network device 106. In some embodiments, the network devices 102, 104, 106 may include home automation network devices that allow a user to access, control, and/or configure various home appliances located within the user's home, such as a television, radio, light, microwave, iron, and/or the like. For example, network device 102 may include a home automation switch that may be coupled with a home appliance.

A user may communicate with the network devices 102, 104, 106 using access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). While only a single access device 108 is shown in FIG.

1, one of ordinary skill in the art will appreciate that multiple access devices may connect with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any air interface or combination of air interfaces (e.g., Zigbee™, Bluetooth™, WiFi™, IR, cellular, LTE, WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can be utilized for communicating with network devices 102, 104, 106 or access device 108 via radio signals in order to provide communication, location, and/or other services to the devices. While two gateways 110 and 112 are shown in FIG. 1, one of ordinary skill in the art will appreciate that any number of gateways may be present within the local area network 100. The wireless network provided by gateway 110 and gateway 112 may be of any type of network familiar to those skilled in the art that can support data communications using any of a variety of commercially-available protocols. For example, gateways 110, 112 may provide wireless communication capabilities for the wireless local area network 100 using particular communications protocols, such as WiFi™ (e.g., IEEE 802.11 family standards, or other mobile communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides wireless network access among one or more computing devices and/or external networks. For example, gateway 110 may include a router and gateway 112 may include a range extender.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application. In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106, and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
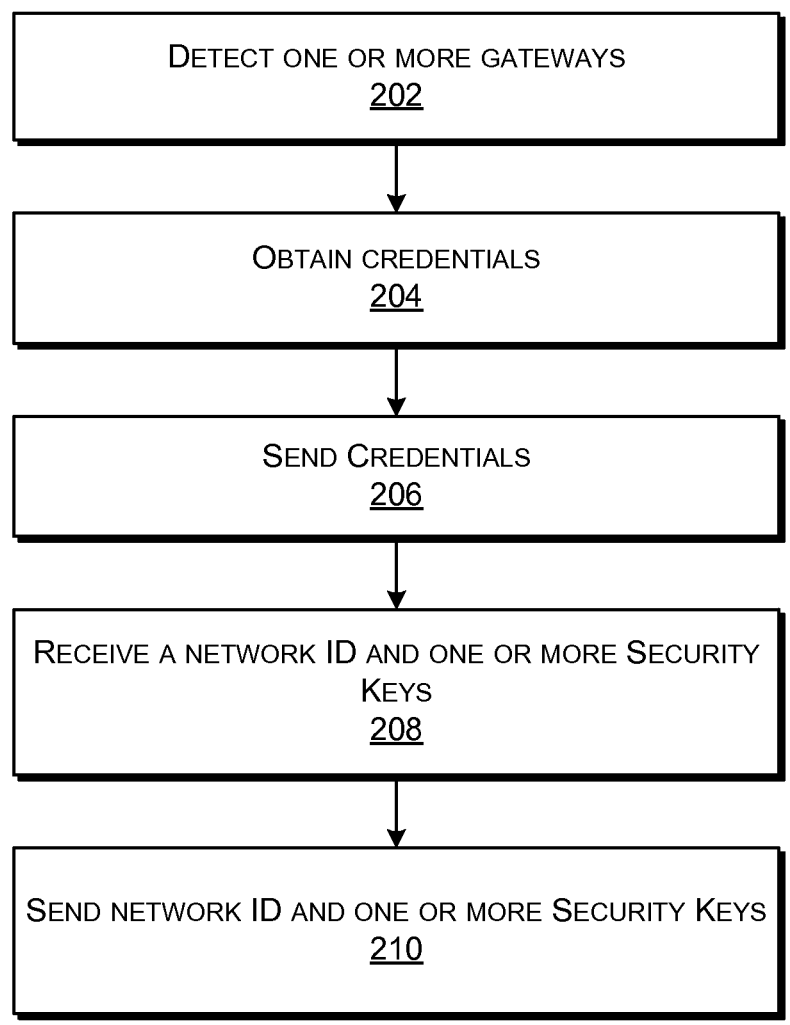
FIG. 2 is a flowchart illustrating an embodiment of a process for registering one or more network devices in accordance with some embodiments.

Upon being turned on, reset, or otherwise powered up (hereinafter "turned on", "reset", "powered up", or the like), the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset. During the provisioning process, the access device may directly communicate with the network device. In some embodiments, direct communication between network devices 102, 104, 106 and access device 108 may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to an access device. The identification information may be sent during a discovery process. For example, the identification information may be sent in response to a discovery request from the access device 108. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the network device may send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the gateway. For example, the login information may be the same information that was originally set up to access the gateway network signals (e.g., when the gateway was initially installed). The access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the wireless local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which they are paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, or the like) and/or information relating to the access device (e.g., MAC address, serial number, application unique identifier, or the like) to the server. In some embodiments, the communication of the credentials from the network device to the cloud network server may be a Hypertext Transfer Protocol (HTTP), a Hypertext Transfer Protocol Secure (HTTPS) communication, a secure Transmission Control Protocol (TCP) communication, or the like. One of ordinary skill in the art will appreciate that other communication mechanisms may be used to communicate between the network device and the cloud network server.

Once the credentials are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. On the other hand, the server may retrieve a unique key that was previously generated for the access device 108 when registering the gateway 110 as the first logical network if it detected that one exists. In such an embodiment where only one access device security key is granted, a logical network ID may be generated for each logical network, and the single access device security key may be associated with the network devices within each logical network via the cloud. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At step 208, the network device may receive the network ID and the set of security keys. For example, once the server has generated a record or profile associating the network device 102 with the first logical network, the server may transmit the first network ID and the first set of security keys to the network device 102. For example, the server may transmit this information securely using any standard secure transmission standard (e.g. HTTPS). The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may then process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed, for example, as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

For example, the network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication. This is one exemplary process for validating the authenticity of such a communication. However, various other processes are possible.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

As previously described, the access device, when located within range of the local area network, may be authenticated using accountless authentication that is based on the access device's authentication with the logical network. For example, if the access device has authorized access to the logical network (e.g., a WiFi network provided by a gateway), the network devices paired with that logical network may allow the access device to connect with them without requiring a network device login. Accordingly, the network device may perform accountless authentication of access devices that have authorization to access the logical network without requiring a user to provide login credentials for the network devices. While located remotely, the access device may also be authenticated to access the network devices via the cloud network using an accountless authentication process. For example, the network ID and the access device's unique security key may be used to allow the access device to communicate with the network devices via the cloud network (e.g., by generating a signature as described above).

When the access device 108 is located within range of both gateways 110, 112 in the local area network 100, the access device 108 does not encounter any issues when attempting to access any of the network devices 102, 104, 106. For example, the access device 108 may perform UPnP discovery and may list all if the network devices 102, 104, 106 that have responded to the discovery request regardless of which network ID the network devices 102, 104, 106 have. Accordingly, the existence of the first and second logical networks with first and second network IDs does not lead to any issues when the access device 108 is located within the local area network 100. However, when the user is located remotely, the access device 108 may only be associated with one logical network at a time. For example, the access device 108, while located remotely from the local area network 100, may query the cloud server with a known network ID (e.g., the first or second network ID). In response, the server will only return the network devices associated with that network ID. As a result, the user will not be able to see all network devices within the user's local area network 100.

As noted, a local area network (e.g. including a home automation network) may include one or more network devices that provide a user with the ability to remotely configure or control the network devices using, for example, an access device. As such, the one or more network devices may be communicatively coupled/connected or paired to the access device. If the communicative connection between a network device and an access device is interrupted, it may be difficult to reestablish the connection. Embodiments of the present invention include devices and methods to efficiently reestablish such a connection using a unique identifier, which may, for example, include location information for the access device or a network device, stored on a device within the local area network or on an external network.

Figure 3:
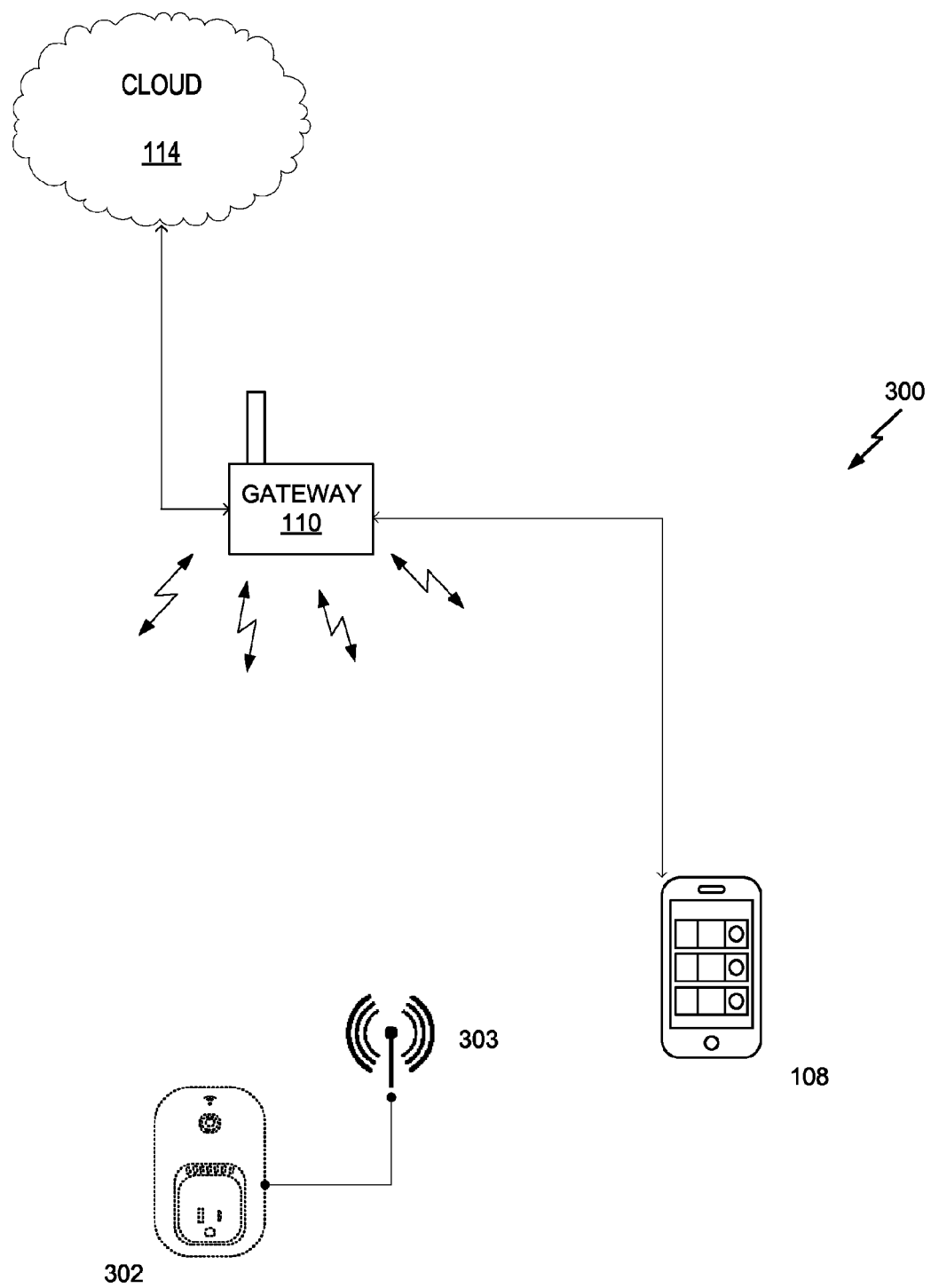
FIG. 3 illustrates an example of a wireless local area network and a new network device, according to embodiments of the present invention.

FIG. 3 illustrates an example of a wireless local area network 300 and a new network device 302, according to embodiments of the present invention. FIG. 3 includes an access device 108, which may connect to local area network 300 and may be used to control network devices on local area network 300, including, for example, network device 302. As noted, in some embodiments, the network device 302 may include home automation network devices that allow a user to access, control, and/or configure various home appliances located within the user's home, such as a television, radio, light, microwave, iron, and/or the like, as described further with respect to FIG. 1.

As shown in FIG. 3, and as described previously with respect to FIG. 2, network device 302 may, upon being powered on or reset to factory settings, broadcast an indication of its presence by broadcasting or otherwise sending identification information to the rest of the local area network (including, for example, access device 108). More specifically, network device 302 may generate a setup access point, such as setup access point 303. A setup access point, such as for example a wireless access point, is a device that allows wireless devices to connect to a network using WiFi or other standards. The setup access point may broadcast the identification information to other devices in the local area network. The identification information may be sent in response to a discovery request from the access device 108. The identification information may also be sent as an automatic component of being powered on for the first time or reset. In some cases, the identification information may include a name of the network device or other identification information.

Setup access point 303 may, to broadcast an indication of its presence, transmit one or more beacons (i.e. beacon frames) containing identification and/or other information. Beacons may be transmitted if, for example, the local area network 300 is a WiFi network. However, embodiments of the present invention may be implemented within other kinds of networks, such as Bluetooth® signals, Zigbee® signals, Ultra-Wideband (UWB) signals, and/or the like. Therefore, network device 302 may transmit management frames or other protocols other than beacon frames, such as those associated with the particular type of network being used.

While embodiments of the present invention may be described with respect to the use of WiFi and beacons being sent to transmit identification and other information from a setup access point to an access device and/or a network device, it is understood that such other protocols may be used with respect to those embodiments. For example, various other methods of conveying information, such as SSID/password information, may be used. Exemplary methods of such conveying of information include near field communications (NFC), RFID, Bluetooth, ultrasonic sensors, gestures, etc. Furthermore, either one device may recognize a signal from another device, indicating a desire to transmit/transfer such information. For example, one device may include a blinking light, a barcode, a fan, etc. For example, a fan in one device may speed up, slow down, start up, stop, etc. in a certain pattern that is recognizable to the other device. In fact, each device may include a slightly different fan speed (e.g. in RPM) that the other device may recognize. As another example, the transmitting device may simply come into contact or "tap" the receiving device to transmit the information, or vice versa. Various other methods of communicating such information from device to device are contemplated within the scope of embodiments of the present invention.

Setup access point 303 may transmit beacons containing various information, including identification information of the device, identification information of the network, a timestamp, information indicating network bandwidth/latency or other capability information, among other information. Furthermore, beacon frames may be transmitted periodically to announce the presence of network device 302. For example, upon being powered on or reset to factory settings, network device 302 may transmit, via setup access point 303, a beacon frame to announce its presence to the other devices on local area network 300. Otherwise, when powered on or reset, network device 302 may not know how to communicate with any other device and/or how to usefully communicate with any network to reach such devices.

Figure 4:
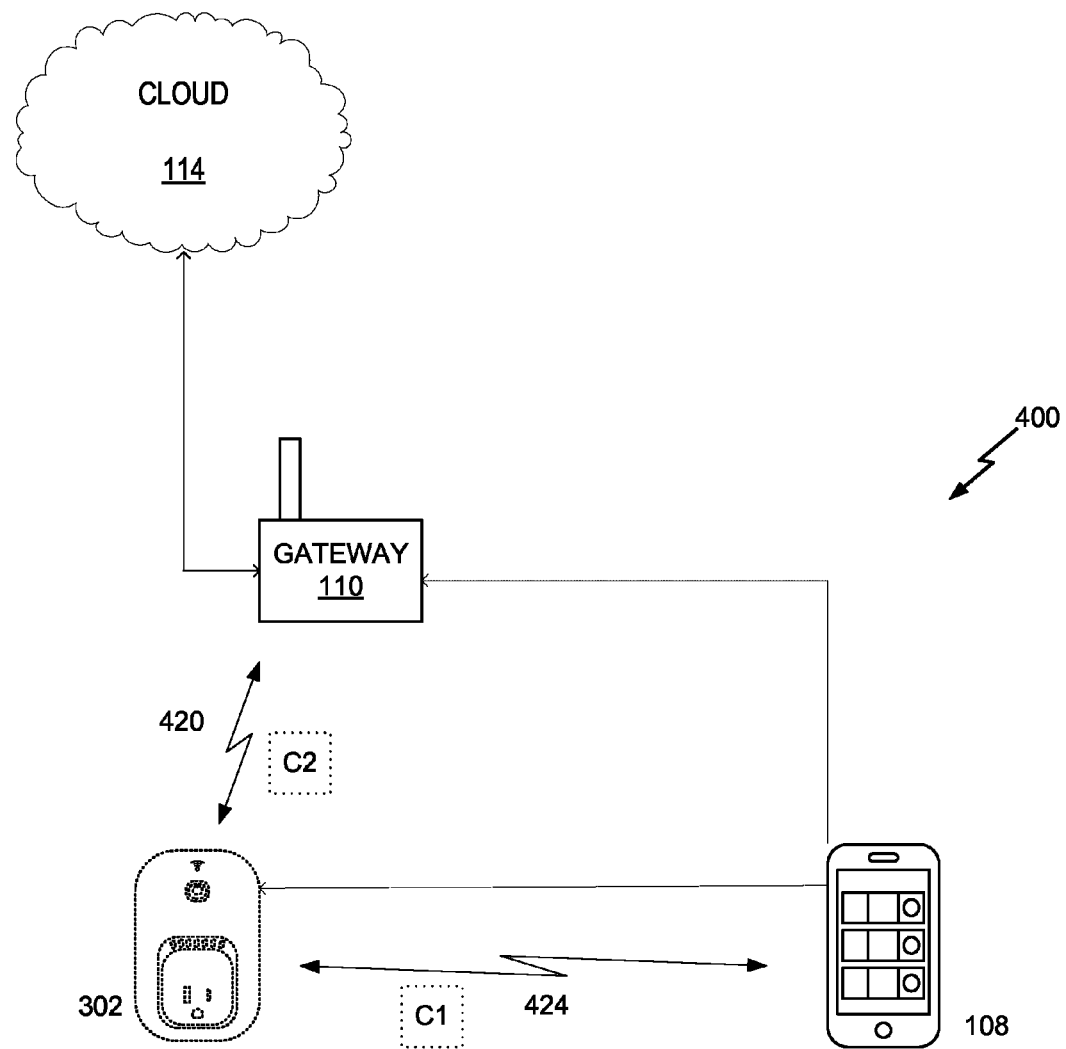
FIG. 4 illustrates an example of a wireless local area network including a network device, according to embodiments of the present invention.

FIG. 4 illustrates an example of a wireless local area network 400 including network device 302, according to embodiments of the present invention. Network device 302 is paired with gateway 110, as described with respect to FIG. 3. Network device 302 is also communicatively coupled to access device 108, as described with respect to FIG. 3.

An application, program, or the like that is installed on and executed by the access device may receive the identification information from the network device via communication path 424 (as shown in FIG. 4). When the application on the access device is launched by a user, the access device may display the identification information for selection by the user. Once the network device identification information is selected (i.e. the access device 108 pairs or connects to network device 302), the network device may send to the access device a list of gateways (e.g. SSIDs) that are detected by the network device via communication path 424. The access device may receive and display the list of gateways. In another exemplary embodiment, the access device may display the list of gateways without a selection from the user. In other words, for example, when the network device is powered on, a list of gateways that are detected by the network device may be displayed on an access device. The user may then select the gateway with which the user wishes for the network device to pair. The access device may then prompt the user to enter login information that is required for accessing the network signals provided by the gateway. The login information may be the same information that was originally set up for accessing the gateway. Once the user has entered login information, the access device may send the login information to the network device, also via communication path 424. The network device may use the login information to pair with the selected gateway. As one example, network device 302 may be paired with gateway 110. Once paired with a gateway, such as gateway 110, the network device may communicate with gateway 110 via communication path 420. The network device may also then be registered with a cloud network (e.g., cloud network 114), as described herein, for example, with respect to FIG. 2.

Once access device 108 has paired with both the network device 302 and gateway 110 and the network device 302 has been authenticated and has joined local area network 400, access device 108 may send commands (e.g. from a user of the access device) to control gateway 110 and network device 302 and any devices connected to the network device (e.g. home automation network devices). As noted, in embodiments of the present invention, the communicative coupling between network device 302 and access device 108 (e.g. via communication path 424) and between network device 302 and gateway 110 (e.g. via communication path 420) may be accomplished over a WiFi network. Therefore, the communicative coupling between network device 302 and access device 108 across communication path 424 may be across an assigned (or chosen) WLAN channel and the communicative coupling between network device 302 and gateway 110 may also be across an assigned (or chosen) WLAN channel. The WLAN channel used by communication path 424 may be the same or different from the channel used by communication path 420.

As noted, when a network device (e.g. network device 302) is turned on, resets, or otherwise powers up, the network device may generate a setup access point, such as setup access point 303, to allow other devices to connect to it via the WiFi network (e.g. local area network 300). This setup access point may be associated with a WLAN channel. Therefore, when the access device 108 pairs or connects to network device 302, it may do so on the WLAN channel associated with the setup access point of the network device 302. For example, as shown in FIG. 4, that channel may be channel C1. In such an example, communication path 424 may use the same channel C1 to transmit communications between network device 302 and access device 108 and vice versa.

When the network device is paired with gateway 110, via the process described with respect to FIGS. 1-4 or otherwise, network device 302 may be paired with gateway 110 across a different channel than channel C1. For example, as shown in FIG. 4, that channel may be channel C2 (note, however, that C2 may be the same channel as C1 in certain embodiments). Gateway 110 may have previously chosen a channel to use that, at the time gateway 110 was last turned on, reset, or otherwise powered up, was the most beneficial channel for the gateway 110 to communicate across or otherwise use. On the other hand, when the access device 108 later pairs or connects to network device 302, it may do so on the WLAN channel, C1, that the network device designated as the most beneficial channel for the network device to communicate across or otherwise use. Furthermore, C1 and C2 may also be different channels if, after being synced to the same channel, gateway 110, network device 302, or access device 108 must be temporarily shut down, restarted, or otherwise disconnected from its respective communication counterpart. For example, if network device 302 is restarted, it may be disconnected from access device 108 and from gateway 110, causing communication paths 424 and/or 420 to communicate across different channels from those channels they previously communicated across once the network device 302 reconnects to the local area network (and therefore access device 108 and gateway 110). In other words, gateway 110 and network device 302 may choose different channels to communicate across since they may choose their respective channels at different times or using different priorities (e.g. latency, bandwidth, noise, etc.).

A network device (or another device) may choose which channel to communicate across based on various factors. For example, the network device may select a channel based on which channel has the most amount of bandwidth across which the network device may be able to communicate. The network device may also select a channel based on which channel has the least amount of noise on it. For example, if network device 302 were to use this strategy to choose a channel across which its setup access point would communicate, network device 302 would most likely not choose the same channel as gateway 110 uses because that channel most likely includes a significant amount of noise, more noise (and less bandwidth) than other possible channels. The network device may also select a channel based on a predetermined programmed channel such that the network device chooses the same channel each time it reboots or powers up. The network device may also select a channel randomly. Furthermore, a channel may choose a channel based on a different set of criteria than another network device on the same network so as to choose a channel based on the priorities that, either based on its current status or based on a predetermined set of criteria, would most benefit that device at that time. These outlined channel choosing strategies are only some examples of the variety of methods that a network device may use to choose such a channel.

As noted, when network device 302 powers up, network device may generate a setup access point, such as setup access point 303, that allows access device 108 to connect to network device 302 on channel C1. After receiving login information (e.g. username and password or other login credentials) via access device 108 (e.g. from the user or otherwise), network device 302 may attempt to connect to gateway 110, via communication path 420, using those login credentials. However, upon attempting to connect to gateway 110, network device 302 may observe (e.g. after performing a site survey) that communication path 420 is using C2, a different channel than C1. In an attempt to communicate with and connect to gateway 110, network device 302 may temporarily disconnect from channel C1, across which it had been communicating with access device 108. For example, network device 302, after powering on, may perform a site survey of the local area network to compile a list of the devices on the local area network and what channels those devices are using to communicate across. In such a site survey, network device 302 may recognize the presence of both access device 108, which was using channel C1 (because, for example, C1 may have been the channel that network device 302 began using for its setup access point upon being powered on), and gateway 110, which is using channel C2. As such, after comparing C1 and C2, network device 302 may recognize that access device 108 and gateway 110 are using different channels. Network device 302 may then, knowing it must connect to channel C2 to communicate with gateway 110, disconnect from channel C1.

After network device 302 is disconnected from channel C1, it is no longer paired with access device 108. Recognizing that it is no longer connected to network device 302, access device 108 may attempt to re-establish its connection with network device 302. If network device 302 has already connected with gateway 110 on channel C2 and established a communication with the local area network via gateway 110, network device 302 may attempt to switch back to channel C1 to re-establish its connection with access device 108. For example, access device 108, upon noticing/observing (e.g. after performing a site survey) that network device 302 has disconnected from channel C1, may wait for a period of time to confirm that network device 302 has disconnected from channel C1 permanently. If network device 302 attempts to switch back to channel C1 to re-establish its connection with access device 108 and access device 108 has continued to stay connected to channel C1, then network device 302 and access device 108 may re-establish their connection.

On the other hand, access device 108 may not wait for a period of time to confirm that network device 302 has disconnected from channel C1 permanently, and may instead immediately or substantially immediately disconnect from network device 302. As such, access device 108, upon noticing that network device 302 has disconnected from channel C1 (and, for example, has switched to channel C2), may perform a site survey of the local area network to discover which WiFi channels are available, which channels the network devices are using to communicate across, and which channels have would be most beneficial to communicate across. For example, such a site survey may yield a list of the available channels and their respective bandwidth, latency, and/or noise so that the access device 108 may choose the best channel to which access device 108 should switch from channel C1. However, access device 108 may also choose a channel to switch to by any other appropriate method. After access device 108 has chosen a different channel to switch to, access device 108 may switch to that channel, and thereafter would no longer be connected to channel C1. If network device 302 then attempts to switch back from channel C2 to channel C1, network device 302 may not be able to find access device 108 because access device 10 has switched from C1 to a different channel. Therefore, network device 302 may not be able to re-establish a connection with access device 108, on channel C1 or otherwise. If network device 302 is unable to re-establish a connection with access device 108, access device 108 (and therefore any user/viewer of access device 108) may not receive confirmation whether network device 302 was able to pair with gateway 110 and join the local area network.

As noted, after receiving login information from access device 108, network device 302 may attempt to connect to gateway 110, via communication path 420, using those login credentials. If the login credentials provided to network device 302 by access device 108 are valid network credentials, network device 302 may pair with/connect to gateway 110 and join the local area network. If, on the other hand, the login credentials provided to network device 302 by access device 108 are not valid network credentials, or if network device 302 is otherwise unable to connect to gateway 110, network device 302 may be denied access to the local area network. If network device 302 is not able to connect to gateway 110 via channel C2 and is denied access to the local area network, and access device 108 switched to a WiFi channel other than C1, then network device 302 may not be connected to any device in local area network 400 or to the user, causing the process of network device 302 connecting to devices on the local area network to fail. More generally, if network device 302 fails to connect (or stay connected) to gateway 110 or any other device on the local area network, then network device 302 may not be able to connect to the local area network at any time. If network device 302 and access device 108 are disconnected from each other (e.g. not communicating on the same channel), then access device 108 may be unable to send control signals to or otherwise control network device 302.

Figure 5:
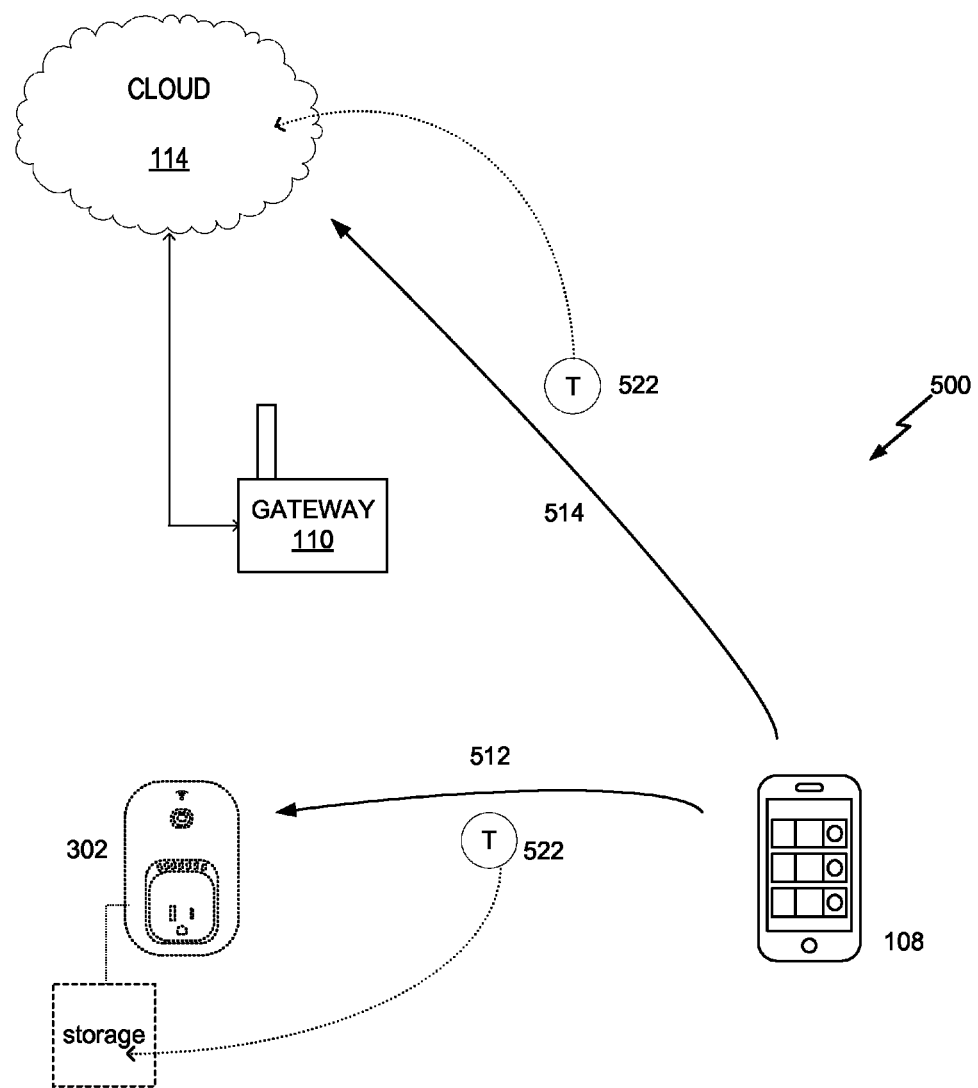
FIG. 5 illustrates an example of a wireless local area network 500 including a network device and a token identifier, according to embodiments of the present invention.

FIG. 5 illustrates an example of a wireless local area network 500 including a network device and a token identifier, according to embodiments of the present invention. Local area network 500, similar to local area networks 300 and 400 shown in FIGS. 3 and 4, respectively, includes gateway 110, network device 302, and access device 108. As noted with respect to FIG. 3, network device 302 may generate a setup access point when it is turned on or otherwise powers on. The setup access point allows other devices to connect to network device 302. For example, the setup access point may broadcast identification information for network device 302 to other devices in the local area network, such as access device 108, so that access device 108 may identify and connect with network device 302. After access device 108 connects to network device 302 via the network device's setup access point, access device 108 may generate a code or token (e.g. session token or setup session token or session ID) or other unique identifier (referred to herein as a code, token, session token, setup token, identifier, unique identifier, etc). This token may be generated by access device 108 to include information related to the access device 108, such as the location of access device 108. For example, the token may represent the location of access device 108 (or its location outside the local area network). The token may also represent other information about access device 108 to indicate to a holder of the token the location of access device 108. For example, the token may include information such as the WiFi channel that access device 108 will be using. Access device 108 may send the token, such as token 522 as shown in FIG. 5, to network device 302 and/or to cloud network 114 (or, for example, to a gateway of the local area network). For example, network device 302 and cloud network 114 may store token 522 in storage, as shown in FIG. 5.

There are various different types of token identifiers that may be used within embodiments of the present invention. For example, the token identifier may include a serial number of access device 108, a MAC address of access device 108, GPS coordinates of access device 108, stored GPS coordinates of other network device(s) on the network, a unique ID of access device 108 in cloud 114, a UDID (unique device identifier) of access device 108, an IMEI (international mobile station equipment identity) of access device 108, a UUID (universally unique identifier) of access device 108, WiFi credentials (e.g. SSID and passphrase) for one or more WiFi networks in the network 500, an WiFi channel that access device 108 is or may use, identification of other network devices that of access device 108 has contacted previously, previously setup account and password in cloud network 114 for access device 108, private IP address of access device 108, private IP address of gateway 110, public IP address and port number of gateway 110 connecting to network 500 to cloud 114, or a WiFi channel that gateway 110 is or may use, among various others. Such exemplary token identifiers may be used on WiFi, ZigBee, Bluetooth, cellular/LTE, IR, or the like.

As noted, the setup access point may transmit one or more beacons (i.e. beacon frames) containing identification and/or other information (e.g. to communicate an indication of its presence). The setup access point may transmit beacons containing various information, including identification information of the device, identification information of the network, a timestamp, information indicating network bandwidth/latency or other capability information, among other information. After access device 108 generates a token or other unique identifier, access device 108 may send the token to network device 302 and/or to cloud storage 114 embedded within a beacon. In other words, while a WiFi beacon frame may be used to transmit information about the network and/or to announce the presence of a network device on a local area network, such a beacon frame may be used to transmit other information such as token 522 or other similar unique identifiers.

Such tokens may also be transmitted using a variety of other methods. Exemplary methods of such conveying of information include near field communications (NFC), RFID, Bluetooth, ultrasonic sensors, gestures, etc. Furthermore, either one device may recognize a signal from another device, indicating a desire to transmit/transfer such information. For example, one device may include a blinking light, a barcode, a fan, etc. For example, a fan in one device may speed up, slow down, start up, stop, etc. in a certain pattern that is recognizable to the other device. In fact, each device may include a slightly different fan speed (e.g. in RPM) that the other device may recognize. As another example, the transmitting device may simply come into contact or "tap" the receiving device to transmit the information, or vice versa. Various other methods of communicating such information from device to device are contemplated within the scope of embodiments of the present invention.

Figure 6:
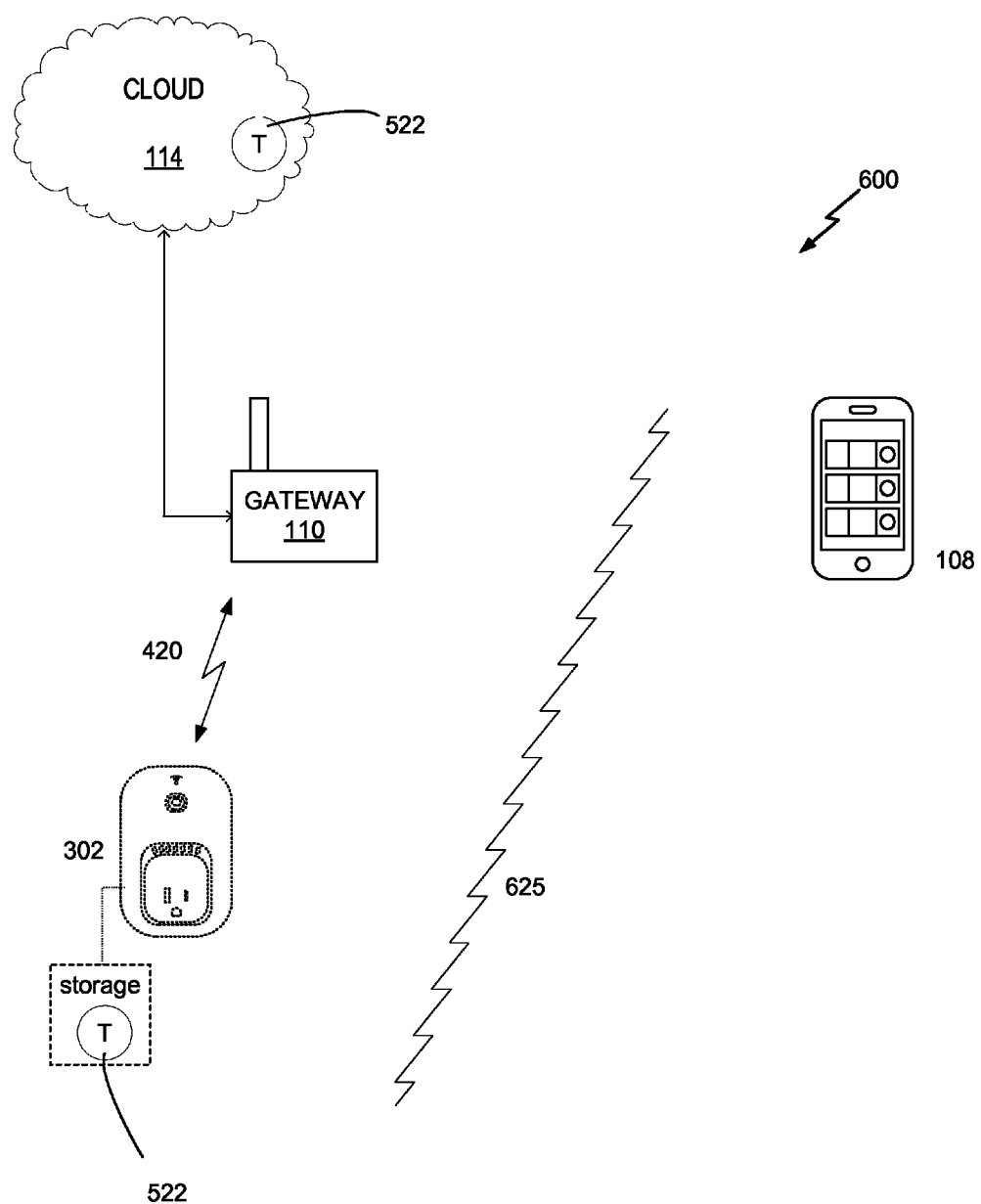
FIG. 6 illustrates an example of a wireless local area network including a network device disconnected from an access device, according to embodiments of the present invention.

FIG. 6 illustrates an example of a wireless local area network 600 including a network device disconnected from access device 108, according to embodiments of the present invention. Since token 522 is a unique identifier that includes information regarding the location of access device 108, token 522 may be used by any device or network that holds token 522 to locate access device 108. For example, as noted, if network device 302 switches channels from the channel it shares with access device 108 (e.g. C1 as shown in FIG. 4) to a different channel that it shares with gateway 110 (e.g. C2 as shown in FIG. 4), and thereafter access device 108 switches channels from the channel it shares with network device 302 (e.g. C1 as shown in FIG. 4) to a different channel, then network device 302 may disconnect/terminate from access device 108 and may not be able to re-connect with access device 108. Such a disconnect between network device 302 and access device 108 is shown in FIG. 6 by element 625. Network device 302 and access device 108 may also disconnect for a variety of different reasons. For example, one of the devices may be shut down, reset or restart. As another example, the network (or a gateway on the network) may shut down, reset or restart. As another example, a portion of one of the devices may cease working Network device 302 and/or cloud 114 may use token 522 to locate, and subsequently reconnect with, access device 108. Similarly, access device 108 may use token 522 to locate, and subsequently reconnect with, network device 302.

Figure 7:
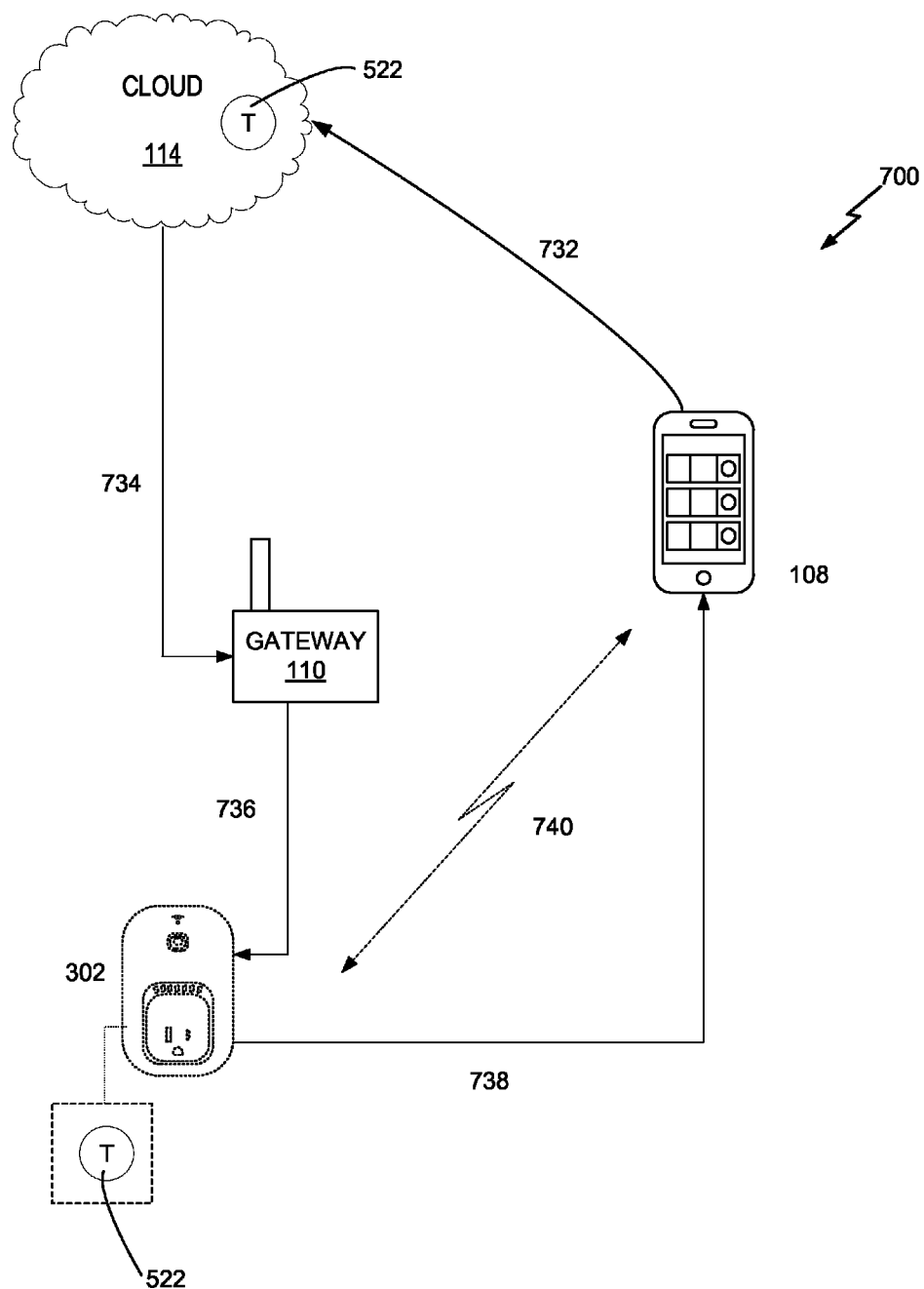
FIG. 7 illustrates an example of a wireless local area network including a network device and an access device, according to embodiments of the present invention.

FIG. 7 illustrates an example of a wireless local area network 700 including a network device and an access device, according to embodiments of the present invention. As noted with respect to FIGS. 5 and 6, network device 302 and/or cloud 114 may use token 522 to locate, and subsequently reconnect with, access device 108, and access device 108 may use token 522 to locate, and subsequently reconnect with, network device 302. For example, as shown in FIG. 7, if access device 108 is disconnected from network device 302 (due to channel switching as described herein or otherwise), access device 108 may send a communication via communication path 732 to cloud network 114 indicating that access device 108 is disconnected from network device 302. Access device 108 may also include in its communication to cloud network 114 a request for cloud network 114 to communicate, e.g. via communication paths 734 and 736, with network device 302 and indicate to network device 302 the location of access device 108. If cloud network 114 has stored a token (e.g. token identifier), such as token identifier 522, including the location of access device 108, cloud network 114 may send that location to network device 302. If network device 302 has already stored the token/identifier 522, cloud network 114 may not need to communicate such information to network device 302. Instead, cloud network 114 may only communicate to network device 302 that access device 108 has disconnected from it (e.g. disconnected from the channel that network device 302 and access device 108 shared) and/or that access device 108 is requesting to reconnect with network device 302. Network device 302 may then reconnect with access device 108, either directly via communication path 738 or through cloud 114 (e.g. via gateway 110). Further, if network device 302 has stored token 522, as described with respect to FIGS. 5 and 6, network device 302, upon recognizing that access device 108 has disconnected from network device 302, may locate access device 108 on its own using the information in token 522. For example, as noted, token 522 may include a channel that access device 108 will be communicating across. In such a case, network device 302 may switch to that channel so it may communicate with, and reconnect to, access device 108. In other words, token 522 and any information located within token 522 may allow for network device 302 and access device 108 to locate each other after network device 302 and access device 108 have been disconnected, either due to either network device 302 or access device 108 switching WiFi channels or for any other reason.

Access device 108, after generating a token, may alternatively transmit the token to a gateway of the local area network. Therefore, the gateway of the local area network may take the place of the cloud network. In other words, if the gateway has stored a token (e.g. token identifier), such as token identifier 522, including the location of access device 108, the gateway may send that location to network device 302. The gateway may then assist the access device 108 and the network device 302 in establishing a communication connection, similar to cloud network 114.

If, on the other hand, network device 302 has not stored token 522, network device 302 may instead, upon recognizing that it has been disconnected from access device 108, send a communication to cloud 114. The communication to cloud 114 may include a request for cloud 114 to locate access device 108 or otherwise communicate to access device 108 that network device 302 has been disconnected from access device 108 and provide means to reconnect with network device 302. Cloud network 114 could send a communication to access device 108 indicating the location of network device 302 to access device 108. Cloud network 114 may also send a communication back to network device 302 including token 522 or other information regarding the location of access device 108.

Generally, cloud network 114, after a request from network device 302 to locate access device 108, may perform any of various tasks to connect (as represented by communication path 740) network device 302 with access device 108. Furthermore, cloud network 114 may choose the method that it deems most efficient to achieve that goal, and may make that decision based on various factors such as which communication path includes the most bandwidth (e.g. least latency), among other factors. As noted, access device 108 may generate token 522 at any time, such as for example immediately after access device 108 connects with network device 302, or the setup access point for network device 302, so that token 522 is stored in cloud 114 and/or network device 302 in case network device 302 and access device 108 are disconnected from each other.

Token 522 may be configured such that token 522 is deleted from storage. As noted, token 522 may include information related to access device 108, including location information of the access device, among other information. Therefore, such information may be deleted so as to not be retrieved by an unwanted party. For example, the token identifier may be deleted automatically after a predetermined amount of time after it was generated. The token may be deleted after a predetermined amount of time after it was stored by a network device and/or a cloud network. The token may be deleted after it is used by the access device, network device, cloud network, etc. to reconnect to another device in the network, such as the access device, or may be deleted if it hasn't been used for such purpose after a certain amount of time. Generally, the token may be deleted in one of these timeframes whether or not the token has been used for security purposes.

In order to delete such a stored token, the device storing the token may be configured to delete the token from storage in one of these timeframes. Alternatively, access device 108 may send a communication to the device storing the token to instruct the device to delete the token.

Figure 8:
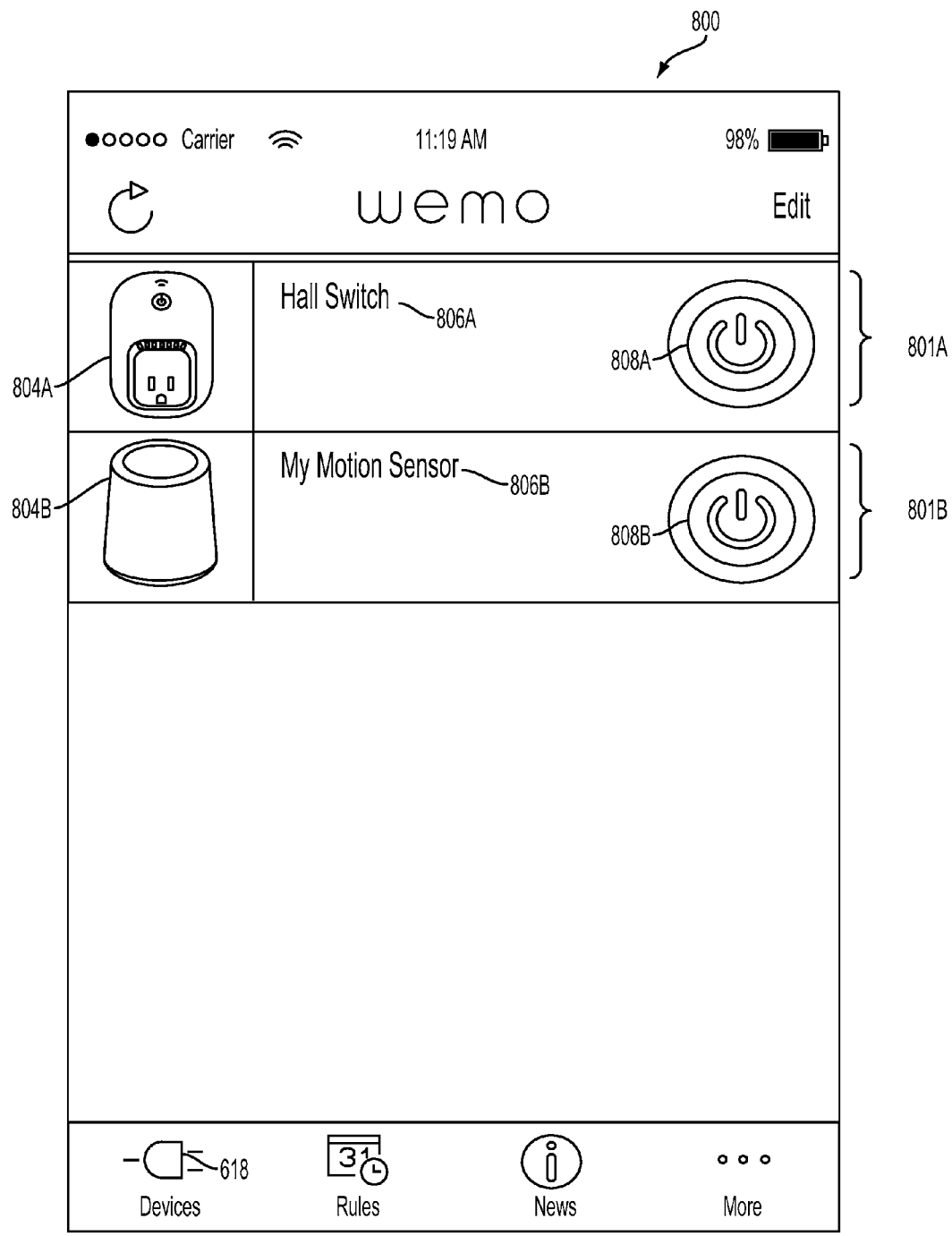
FIG. 8 is an illustration of an exemplary user interface display for an application on an access device in accordance with embodiments of the present invention.
Figure 9:
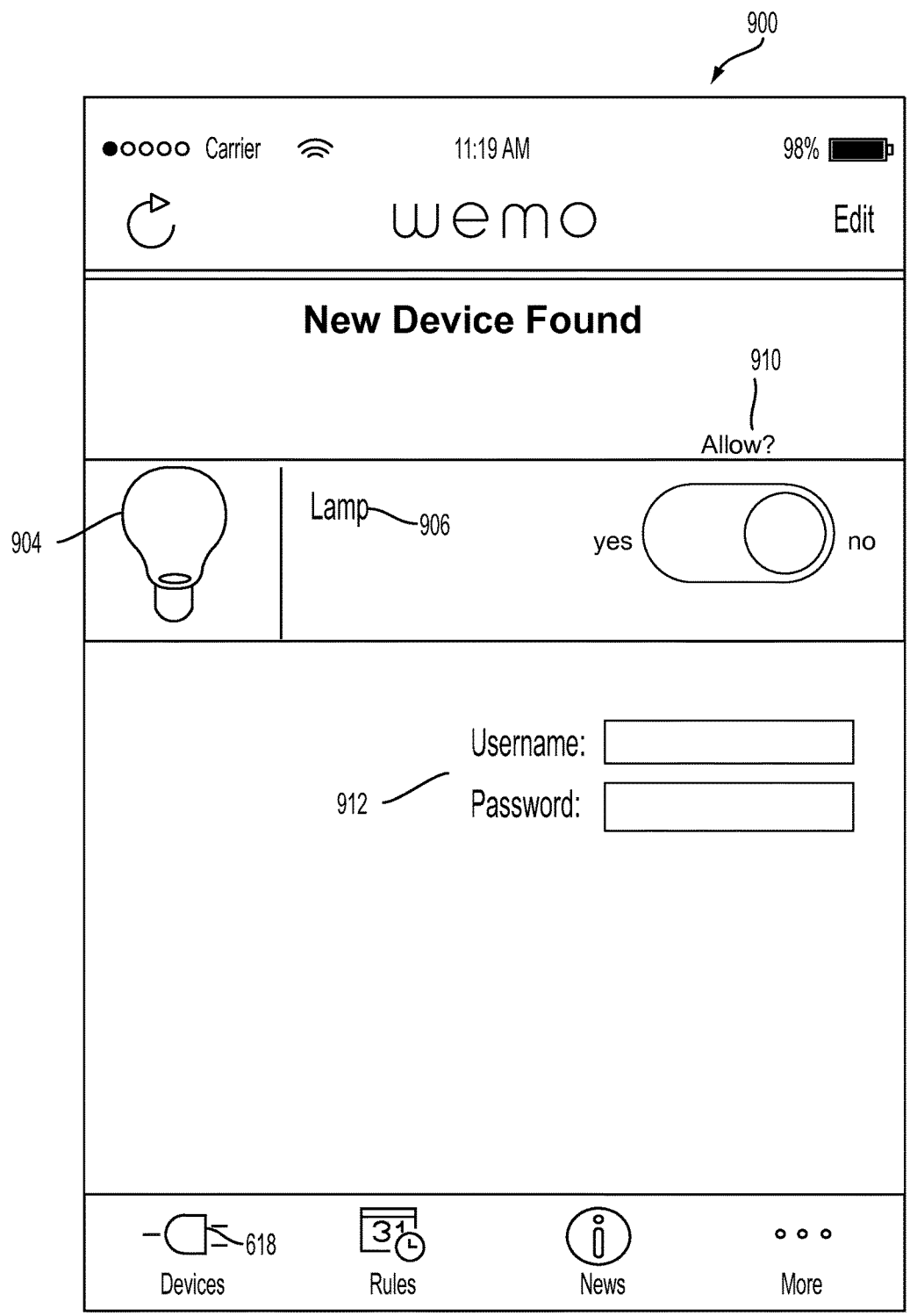
FIG. 9 is an illustration of an exemplary user interface display for an application on an access device in accordance with embodiments of the present invention.
Figure 10:
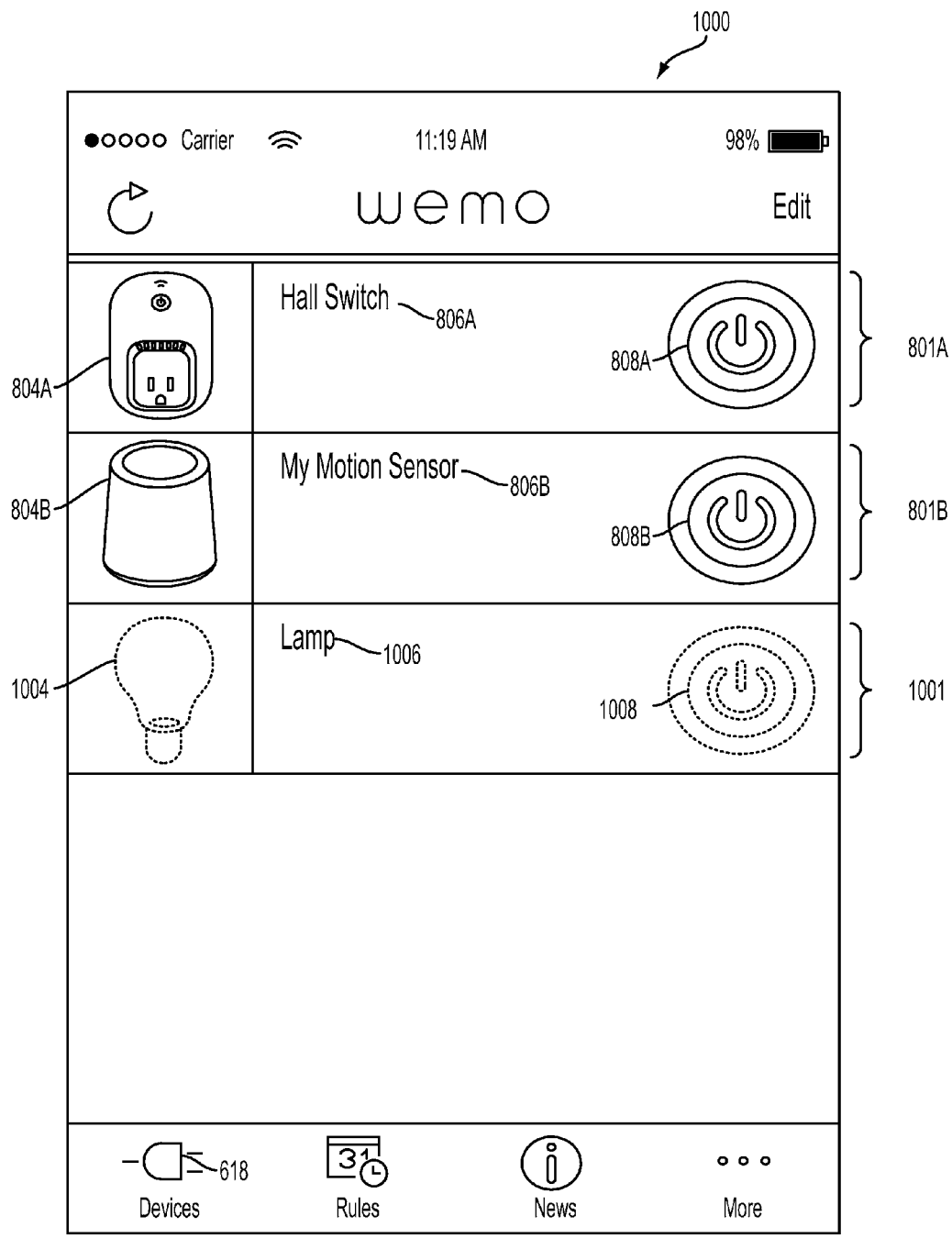
FIG. 10 is an illustration of an exemplary user interface display for an application on an access device in accordance with embodiments of the present invention.

FIGS. 8-10 illustrate exemplary embodiments of screenshots of an exemplary user interface (UI) display for an application on an access device, according to embodiments of the present invention. However, the exemplary UIs are not limited to these example embodiments. In an embodiment of the invention, the visual interfaces illustrated in FIGS. 8-10 are displayed on a mobile computing device, which can have a touch sensitive (i.e., touch screen) display device. For ease of explanation, the monitoring and control operations discussed below with reference to FIGS. 8-10 are described in the context of an application executing on an access device 108 with a touch-screen display device. However, the operations are not intended to be limited to the exemplary device shown in FIGS. 8-10. It is to be understood that the user interfaces illustrated in the exemplary embodiments of FIGS. 8-10 can be readily adapted to be rendered on displays of a variety of computing device platforms running a variety of operating systems. Throughout FIGS. 8-10, displays are shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

FIG. 8 illustrates an exemplary user interface display 800 for an application on an access device, according to embodiments of the present invention. FIG. 8 discloses a list of two exemplary network devices, including devices 804A and 804B, which have displays 801A and 801B assigned to devices 804A and 804B respectively. Device 804A is connected to a hall switch 806A and device 804B that is connected to a motion sensor 806B. Device 804A can be turned on by a user by pressing button 808A and device 804B can be turned on by a user by pressing button 808B.

FIG. 9 illustrates another exemplary user interface display 900 for an application on an access device, according to embodiments of the present invention. As noted with respect to FIG. 3, an access device, such as access device 108, may communicate with network device 302 and/or setup access point 303 of network device 302 and may confirm whether the network device should be allowed to join the local area network. As another example, a device on the local area network, such as gateway 110, may communicate with access device 108 to confirm whether the network device should be allowed to join the local area network such that the network device is associated with the local area network. As such, access device 108 may present/display a query 910 ("Associated Device?") to a user of access device 108 requesting an input regarding whether the user wants the new network device to be connected to the local area network. The user may use the query switch to select "yes" or "no" to the query to indicate to the access device whether the newly recognized device should be associated with the local area network such that the device should be allowed to join the network. The user may also input login credentials, such as login credentials 912 including a username and password, that the new network device may use to join the network. After the user inputs an answer to the query into the UI display of the access device, access device 108 may transmit a communication to network device 302 indicating that the new network device is or is not intended (e.g. by the user) to be connected to the local area network including the login credentials inputted by the user. Thereafter, as noted with respect to FIG. 6, after network device 302 receives a communication from access device 108 that the new network device is associated with the local area network, network device 302 may use the login credentials to pair with gateway 110 and continue the process of joining the network device with the local area network.

FIG. 10 illustrates another exemplary user interface display 1000 for an application on an access device, according to embodiments of the present invention. FIG. 10 discloses a list of exemplary network devices, including devices 804A and 804B, which have associated displays 801A and 801B respectively, as shown in FIG. 8. FIG. 10 also discloses a display 1001 associated with the new network device, network device 904 that is connected to lamp 906. Display 1001 (which shows network device 1004, connected to lamp 1006) may appear on UI display 1000 after network device 904 has joined the local area network (and therefore after a user enters an input to indicate to the access device that the newly recognized device is be associated with the local area network such that the device should be allowed to join the network). Similar to power button 808A for device 804A and power button 808B for device 804B, the display 1001 for new network device 904 includes power button 1008 for turning lamp 906 on and off.

As noted, network device 302, which may be network device 1004 as shown in FIG. 10, may fail to pair with gateway 110 and may fail to join the local area network due to incorrect/invalid login credentials. More specifically, if the login credentials provided to network device 302 by access device 108 are valid network credentials, network device 302 may pair with/connect to gateway 110 and join the local area network. However, if the login credentials provided to network device 302 by access device 108 are not valid network credentials, or if network device 302 is otherwise unable to connect to gateway 110, network device 302 may be denied access to the local area network. If network device 302 is not able to connect to gateway 110 via its selected channel and is denied access to the local area network, and access device 108 switched to a different WiFi channel, then network device 302 may not be connected to any device in the local area network or to the user. This may cause the registration process for network device 302 to fail. More generally, if network device 302 fails to connect (or stay connected) to gateway 110 or any other device on the local area network, then network device 302 may not be able to connect to the local area network at any time. For a specific example, if registration of network device 1004 fails as described with respect to network device 302, network device 1004 may not be displayed on UI display 1000 as shown in FIG. 10. In other words, access device 108 may continue to show UI display 800 (which does not include display 1001 of network device 1004), even after the attempted pairing of network device 302 with gateway 110. Therefore, a user of access device 108 (which may be the same user that entered a response to the "Associated Device?" query and login credentials as shown in FIG. 9) that views the UI display of access device 108 may not see that network device 1004 (one example of network device 302) has joined the network because network device 1004 may not be displayed as shown in UI display 1000. In other words, the user may not know whether or not network device 1004 joined the network. Furthermore, unless the user knows to restart/reset network device 1004, the user may continue to be unaware of the status of network device 1004.

Figure 11:
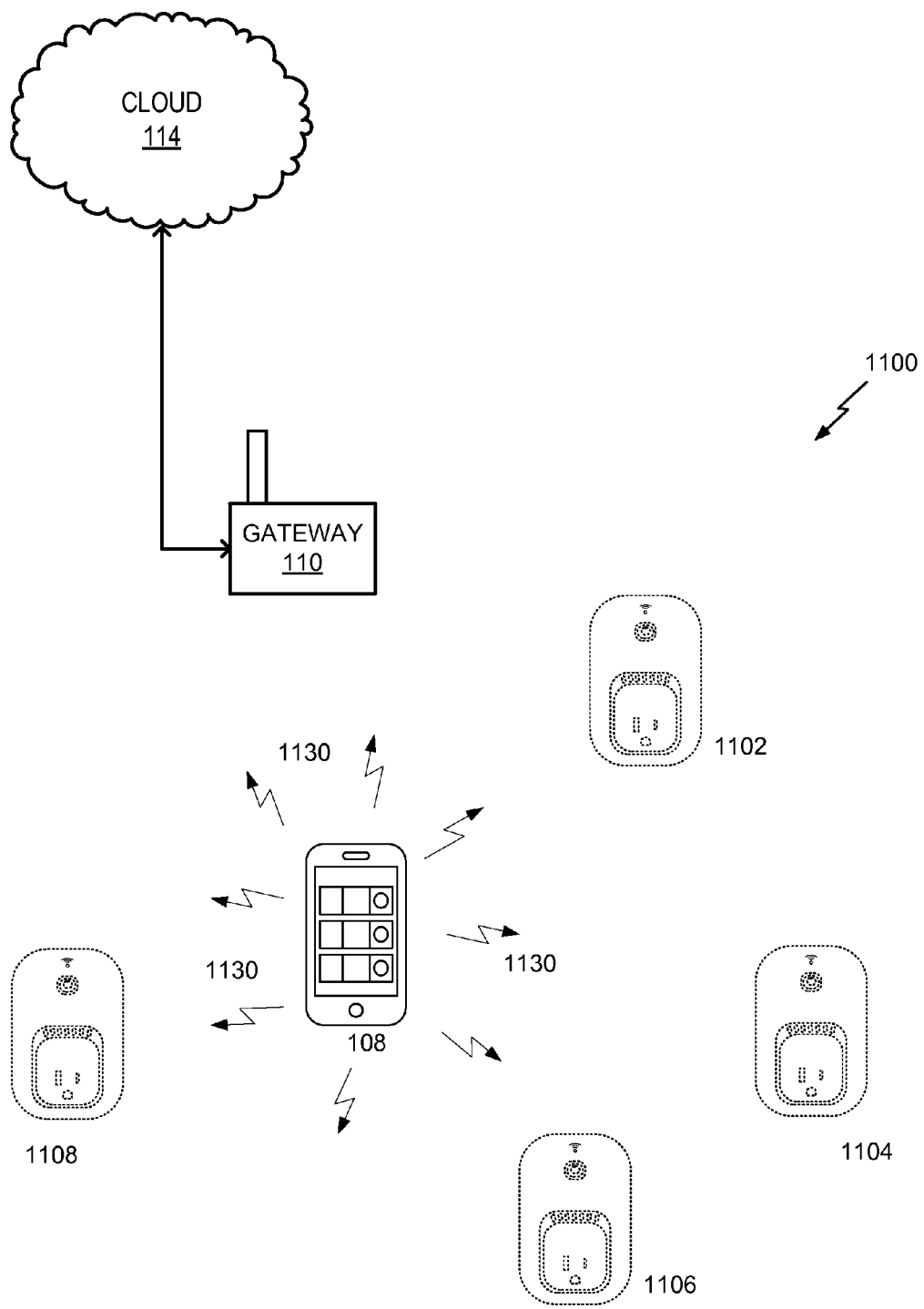
FIG. 11 is an illustration of an example of a network environment, in accordance with some embodiments.

FIG. 11 illustrates an example of a network 1100, according to embodiments of the present invention. Specifically, the network 1100 can be a wireless local area network enabling an access device to communicate with network devices to control adjustment of attributes related to operation of the network devices. Network 1100 includes network device 1102, network device 1104, network device 1106, and network device 1108. The network 1100 also includes access device 108. In other words, the network 1100 may be substantially similar to the network 100 except that access device 108 has been turned on near the network 1100, to which it is associated, or has entered an area to which the network 1100 can reach.

When access device 108 can enter the network 1100 as shown in FIG. 11, access device 108 may be authenticated based on the access device's authentication with the logical network or may otherwise commence communication with cloud network 114. Access device 108 may also communicate notification of its presence or other information directly to other network devices 1102-1108 within network 1100, as shown in FIG. 11 by communication paths 1130. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 1100, including network device 1102, network device 1104, network device 1106, and network device 1108, information/data regarding its status. Such status data may include the fact that it is present and turned on, or other status data/information. At any time that network devices 1102, 1104, 1106 and 1108 recognize that access device 108 is present at network 1100, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 1102-1108 and access device 108 may each receive communication from other network devices around the network 1100, including the status of each of those network devices, network devices 1102-1108 and/or access device 108 may be continuously scanning network 1100 (including, for example, running discovery algorithms) to determine whether any devices within the network have moved, turned on/off or otherwise added to or subtracted from the network 1100, or have otherwise changed statuses.

Since network devices 1102-1108 and access device 108 may each receive communication from other devices around network 1100, including the status of each of those devices, each network device within network 1100 may know the status of each other network device in the network 1100. For example, access device 108 or devices 1102-1108 may not be required to communicate with cloud network 114 in order to obtain one or more of such statuses. Since cloud network 114 is an external network and may be remote from network 1100, communication between network devices within the network 1100 and cloud 114 may take more time than communication between two devices within network 1100. For example, communication between devices within network 1100 may take anywhere from 1 millisecond to 100 milliseconds, while communication between a device within network 1100 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 1100 may choose to send and receive/retrieve statuses directly with other devices within the network 1100 instead of communicating such information via cloud network 114. When a network device receives status data from another network device on the device's local area network 1100, it may store that status data so that it may retrieve and use that status data at a later time.

Figure 12:
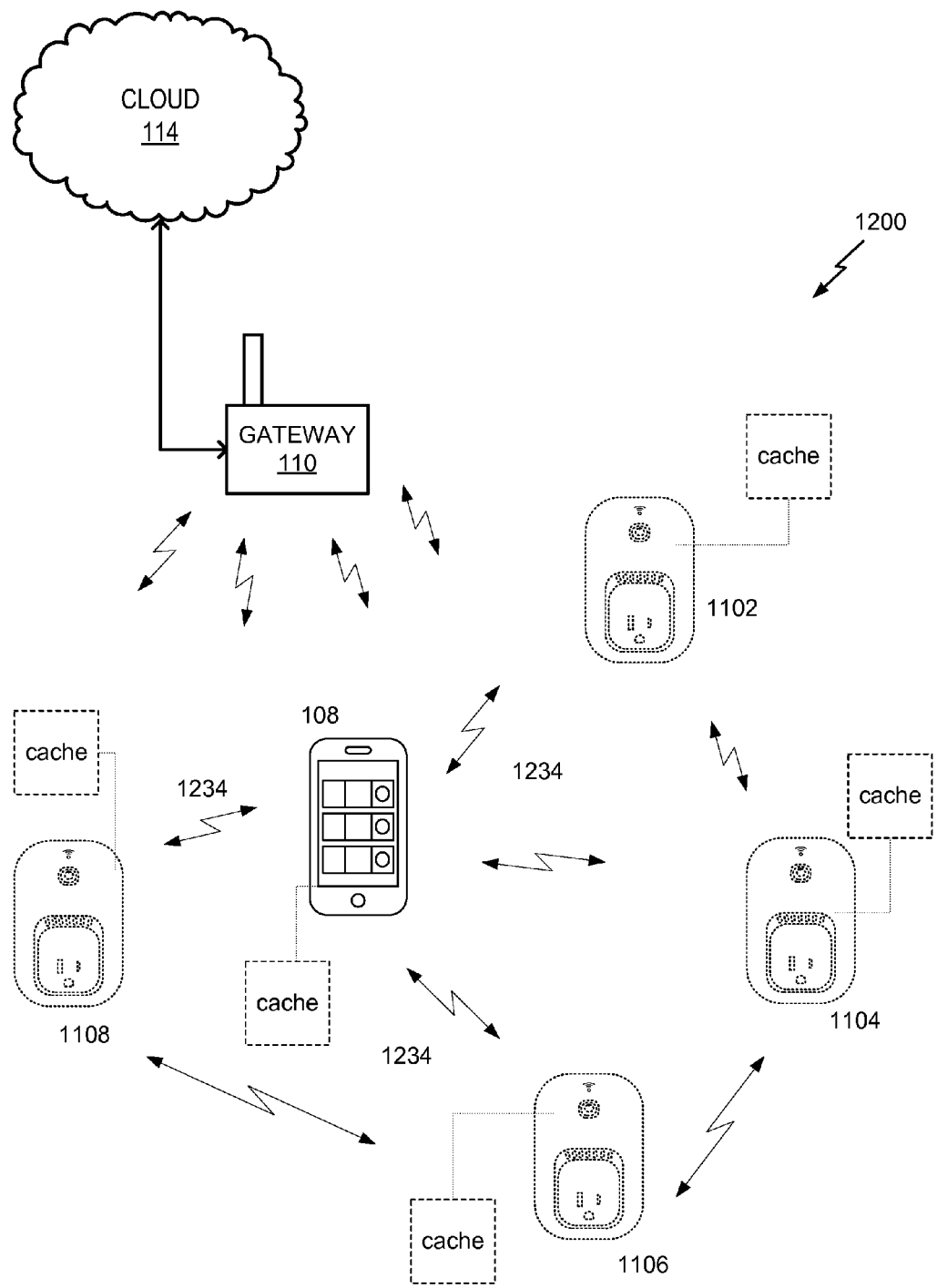
FIG. 12 is an illustration of an example of a network environment, in accordance with some embodiments.

FIG. 12 illustrates an example of a network 1200, according to embodiments of the present invention. The local area network 1200 may include network device 1102, network device 1104, network device 1106, network device 1108, and access device 108. FIG. 12 also illustrates that one or more network devices 1102-1108 and/or access device 108 may include a storage device, such as a cache, for storing data, including data regarding its own status and data regarding statuses received from the other devices within local area network 1200. For example, access device 108 may, after being powered up, broadcast/send its status to network device 1108 via communication 1234. Network device 1108 may store the status data received from access device 108 until the next time access device 108 updates its status by sending new/updated status data to network device 1108. Cache may be used for storage within network devices 1102-1108 and/or access devices within the local area network 1200 so that each of the devices may be able to quickly retrieve the data it needs from storage. An application operating on the access device 108 can access the cache to obtain information to display the visual interface for each network device 1102-1108 registered within the network 1200. Although a caching device may be used to store such data within the network and/or access devices within the local area network 1200, other types of storage may be used.

The cache can contain a known interface list including interface information for different, known types of devices. The known list can include a record for each network device known by the access device 108 to exist on the network 1200. When an application is run on the access device 108, the access device 108 can access the known interfaces in the cache to present the display of access device 108. The display can present one or more visual interfaces, each corresponding to a network device known to exist on the network 1200. Each visual interface can be generated based on a visual interface module corresponding to each device on the network 1200. In an example, the display can include a visual interface (e.g., a module tile) for each device in the network 1200 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 1200. For example, the status display can include a speed of a fan (e.g., a fan speed of 56 in a range of values between 0 and 100) of the network device 1102 (e.g., a fan), a value of sensitivity of a sensor (e.g., a value of 34 in a range of values 0-100) for the network device 1104 (e.g., a motion sensor), a value of brightness (e.g., 65 percent brightness) for the network device 1106 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 1200 and can use that information to update its own cache, update the status display, and/or pass the information to the cloud network 114 and/or the gateway 110 for trouble shooting and/or storage.

Even though each network device may know and store (e.g. in cache) the state of each other network device within local area network 1200, a network device may not know when another network device changes status (e.g. turns/powers off). However, network devices and/or access devices within local area network 1200 may broadcast/send any updates in its status to other devices on the network. For example, if network device 1102 changes status, it may send status data to the other network devices, such as network devices 1104, 1106 and 1108 and to access device 108. However, network device 1102 may not know which devices to update since the other devices may change statuses periodically (e.g. turn off).

Therefore, a network or access device may subscribe to another network or access device within local area network 1200. For example, network devices 1104, 1106 and 1108 and access device 108 may subscribe to status data notifications/updates from network device 1102. Such a subscription may be registered for upon initial connection with network device 1102 when network device 1102 first enters local area network 1200 or at any other time after network device 1102 has been associated with local area network 1200. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 1102 may store a list of network devices 1104, 1106 and 1108 and access device 108 after those devices subscribe to network device 1102. Then, when network device 1102 undergoes a change in status, network device 1102 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 1200, each contain continuously updated statuses of each other device on the network and obtain those statuses and updates through direct communication without necessary use of the cloud.

Figure 13:
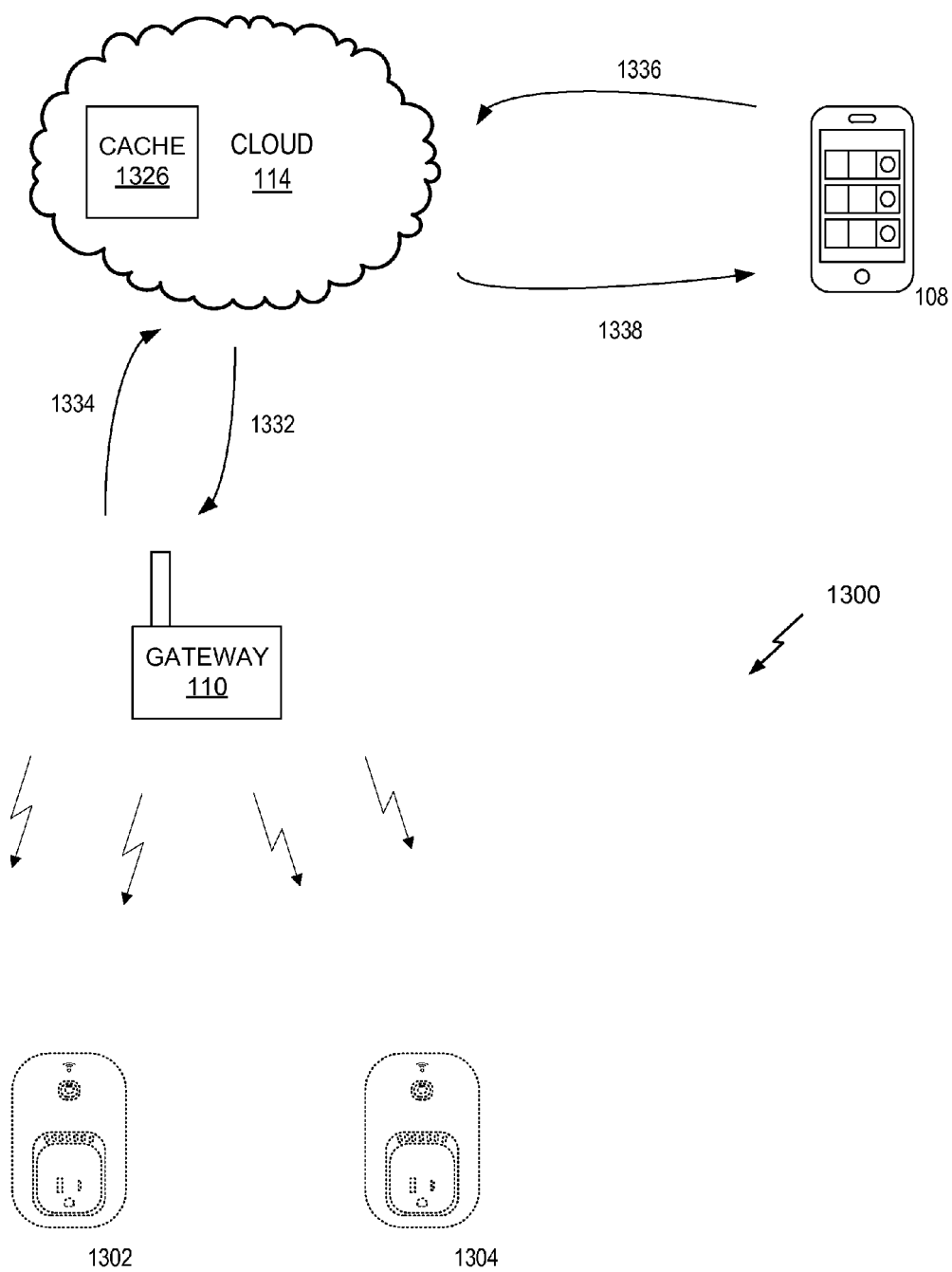
FIG. 13 is an illustration of an example of a network environment, in accordance with some embodiments.

FIG. 13 illustrates an access device 108 that is located remotely from network 1300 (e.g. local area network), according to embodiments of the present invention. Local area network 1300 includes gateway 110 and network devices 1302 and 1304 (which may be, for example, the same as any of network devices 1102-1108 in FIGS. 11 and 12), as shown in FIG. 13. However, network 1300 may also include a variety of other network devices and one or more access devices directly connected to network 1300. Gateway 110 is connected to cloud network 114, and allows network devices 1302 and 1304 to connect to cloud 114, the internet, or other external networks via gateway 110. In some embodiments, the network devices 1302 and 1304 may include home automation devices that allow a user to access, control, and/or configure various home appliances located within the user's home, such as a television, radio, light, microwave, iron, and/or the like.

Access device 108 is not directly connected to network 1300. Instead, access device 108 is external to network 1300 and may connect to cloud network 114 and to network 1300 via cloud network 114. As noted, network devices 1302 and 1304 may change status on a periodic basis. In some embodiments, even when external to and not directly connected to network 1300, an access device may request to check the status of the devices on the network. When access device 108 seeks to check the status of any device on the network, the access device 108 may transmit/send a communication 1336 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 1338 of such status data to the access device 108. For example, after network devices 1302 and 1304 are turned on, authenticated and are a part of network 1300, network devices 1302 and 1304 may communicate their statuses to cloud network 114. Furthermore, any time the status of network devices 1302 and 1304 changes, the device that incurred a status change may push/send information (e.g. an indication) of that status change to cloud network 114. Cloud network 114 may store, in cache 1326 or otherwise, the statuses (which may be time stamped in metadata or otherwise) of network devices 1302 and 1304. Therefore, when access device 108 requests from cloud network 114 the statuses of devices on network 1300, cloud 114 may send its most recently stored/updated statuses to access device 108.

To obtain the most updated status data of devices within network 1300, cloud 114 may, upon receiving a request for status data related to network devices 1302 and 1304, transmit/send a communication 1332 (e.g. request, query, etc.) for such status data to network devices 1302 and 1304 via gateway 110. Once network devices 1302 and 1304 receive this request, network devices 1302 and 1304 may send a communication 1334 (e.g. updated status data) to cloud 114 to replace the previously stored/cached statuses in cache 1326. Upon receipt of updated status data 1334 from network 1300, cloud 114 may send a communication 1338 of such status data to the access device 108.

However, the process of cloud network 114 requesting updated statuses from network devices 1302 and 1304 within network 1300 may cause latency within the system. More specifically, the time required for cloud network 114 to request updated statuses from network devices 1302 and 1304 and to in turn receive updated statuses from network devices 1302 and 1304 may be substantially greater than the time required for cloud network 114 to send its currently stored statuses (without being updated) for network devices 1302 and 1304 to access device 108. For example, of the total time required for access device 108 to receive updated statuses from cloud network 114, 80% or more of that total time may include cloud network 114 requesting updated statuses from network devices 1302 and 1304. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 1302 and 1304 is the transmission of data between cloud 114 and network devices 1302 and 1304, the access device 108 and cloud network 114 may maximize efficiency by minimizing the effect of the transmission of data between cloud 114 and network devices 1302 and 1304 on the whole process/system.

Figure 14:
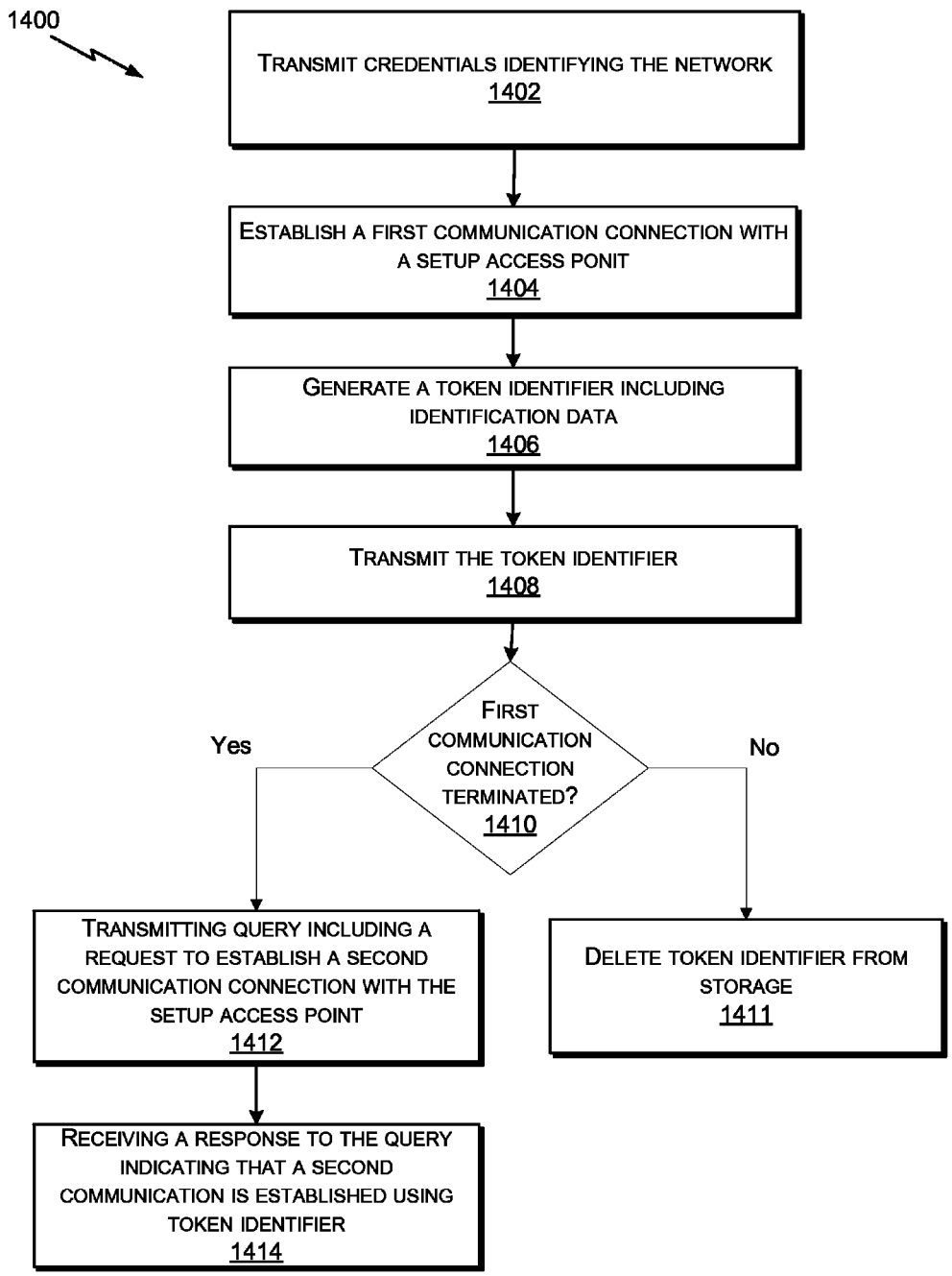
FIG. 14 shows a flow chart of an exemplary process for an access device that re-establishes a communication with a new network device in range of a local area network, according to embodiments of the present invention.

FIG. 14 shows a flow chart of an exemplary process 1400 for an access device that re-establishes a communication with a new network device in range of a local area network, such as local area networks 300-700, according to embodiments of the present invention. In step 1402, an access device transmits credentials to a new network device for the network device to join a local area network. The access device may receive such credentials during/after it has paired with the network gateway and has itself been authenticated to communicate with and join the network. As such, since the access device has obtained such network credentials, it may assist any new network device in joining the network (after being approved by the network or a user connected to the network). In other embodiments of the present invention, the access device may not be required to transmit network credentials to the new network device. The network device may instead receive such network credentials directly from a gateway of the network or from another network device from within the network.

Step 1404 includes establishing a first communication connection with a setup access point of the new network device. As noted, when a network device is turned on, resets, or otherwise powers up, the network device may generate a setup access point, such as setup access point 303, to allow other devices (e.g. the access device) to connect to it via the WiFi network.

After connecting to a setup access point of the new network device, the access device may generate a token identifier including identification data of the access device, as shown in step 1406. The token or code (e.g. session token or setup session token) or other unique identifier may be generated by the access device to information related to the access device, such as the location of the access device. For example, the token may represent the location of the access device (or its location outside the local area network). The token may also represent other information about the access device to indicate to a holder of the token the location of the access device. For example, the token may include information such as the WiFi channel that the access device will be using. The access device may send the token to a network device on the local area network and/or to an external network (e.g. cloud network).

Step 1408 includes transmitting the token identifier to, for example, a network device or to an external network (e.g. cloud network). The token identifier may be transmitted to the network device or to an external network so that the access device may be located after a connection between the access device and the network device is terminated. In other words, if a connection between the access device and a device on the local area network device is terminated, the token identifier may be used by a device on the local area network to locate the access device or for the access device to locate a network device via, for example, the external network. Once the token is generated and transmitted to, for example, a network device, the token identifier may be stored by the network device for later use.

Step 1410 includes a decision step including whether the first communication has been terminated. For example, when a network device powers up and generates a setup access point, the setup access point is configured to communicate on a certain channel. After receiving login information, the network device may attempt to connect to a gateway of the local area network using those login credentials. However, upon attempting to connect to the gateway, the network device may recognize that the channel used by its setup access point is different than the channel used by the gateway. In an attempt to communicate with and subsequently connect to the gateway, the network device may temporarily disconnect from its channel. For example, the network device may perform a site survey of the local area network to compile a list of the devices on the local area network and what channels those devices are using to communicate across and determine such a use of different channels. There are various other reasons that the first communication may be terminated.

If, in response to decision step 1410, the first communication has been terminated, then steps 1412 and 1414 are performed. Step 1412 includes transmitting a query including a request to establish a second communication connection with the setup access point of the network device and step 1414 includes receiving a response to the query indicating that a second communication is established using the token identifier. For example, a network device and/or cloud network, which previously may have stored the token identifier, may use the token to locate, and subsequently reconnect with, the access device, and the access device may use the token to locate, and subsequently reconnect with, the network device. More specifically, for example, the access device may send a communication/query to a cloud network indicating that the access device is disconnected from the network device. The access device may also include in its communication to the cloud network a request for the cloud network to communicate with the network device and indicate to the network device the location of the access device. The network device may use the information included in the token to find and re-connect with the access device.

If, on the other hand, the first communication has not been terminated, then step 1411 is performed. Step 1411 includes deleting the token identifier from storage. As noted, the token may be deleted for a variety of reasons and in a variety of ways to maintain security of the information included in the token. For example, such information may be deleted so as to not be retrieved by an unwanted party.

Figure 15:
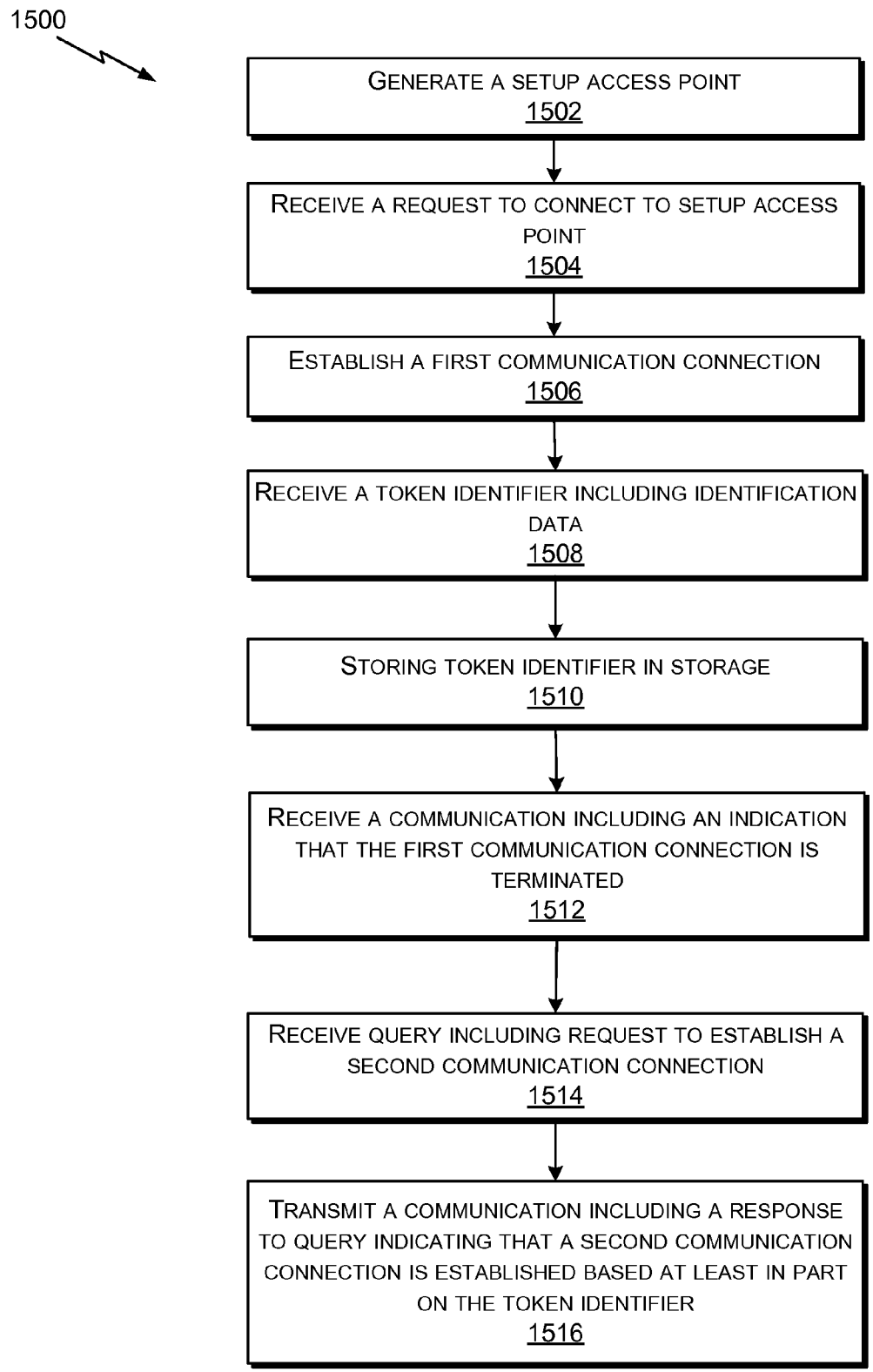
FIG. 15 shows a flow chart of an exemplary process for a network device that re-establishes a communication with a new network device in range of a local area network, according to embodiments of the present invention.

FIG. 15 shows a flow chart of an exemplary process 1500 for a network device that re-establishes a communication with a new network device in range of a local area network, such as local area networks 300-700, according to embodiments of the present invention. However, while exemplary process 1400 is an exemplary process described from the perspective of an access device attempting to re-establish a communication connection with a network device, exemplary process 1500 is an exemplary process described from the perspective of a network device attempting to re-establish a communication connection with an access device.

Step 1502 includes generating a setup access point. For example, the new network device may generate a setup access point, which allows wireless devices, such as the new network device, to connect to a network using WiFi or other standards. The setup access point may transmit one or more beacons (i.e. beacon frames) or other transmission protocols containing various information and/or an indication that the new network device is present (e.g. within range of the local area network). Such communications may be received by another device on the network, such as an access device such that the access device requests to connect to the setup access point, as shown in step 1504. More specifically, step 1504 includes receiving a request (e.g. from an access device) to connect to the setup access point, and step 1506 includes the establishing of a communication connection between the access point and a device such as an access device.

Step 1508 includes receiving a token identifier including identification data and step 1510 includes storing the token identifier in storage. The token identifier may be generated by an access device and then sent to the network device and stored by the network device. For example, the token may represent the location of the access device. Since the token is a unique identifier that includes information regarding the location of the access device, the token may be used by any device or network that holds the token (e.g. the network device) to locate the access device.

Step 1512 includes receiving a communication including an indication that the first communication connection is terminated. For example, as noted with respect to FIG. 6, if a network device switches channels from the channel it shares with the access device to a different channel, for example the channel that it shares with the gateway, and thereafter the access device switches channels from the channel it shared with the network device to a different channel, then the network device may disconnect/terminate from access device and may not be able to re-connect with the access device. Thereafter, the token identifier may be transmitted to the network device or to an external network so that the access device may be located after a connection between the access device and the network device is terminated. In other words, if a connection between the access device and a device on the local area network device is terminated, the token identifier may be used by a device on the local area network to locate the access device or for the access device to locate a network device via, for example, the external network.

Step 1514 includes receiving a query including a request to establish a second communication connection. More specifically, step 1514 includes receiving, at the network device, a query including a request to re-establish a communication connection between the network device and an access device. For example, the network device may receive a query, request or message from the cloud network, which received a query, request or message from the access device indicating that the access device had disconnected from the network device (e.g. because the network device, and subsequently the access device, switched channels, or for a different reason). The network device and/or cloud network, which previously may have stored the token identifier, may use the token to locate, and subsequently reconnect with, the access device, and the access device may use the token to locate, and subsequently reconnect with, the network device. The access device may also include in its communication to the cloud network a request for the cloud network to communicate with the network device and indicate to the network device the location of the access device. The network device may use the information included in the token to find and re-connect with the access device. After the network device has reconnected with the access device, the network device may transmit a communication including a response to the query indicating that a second communication connection is established based at least in part on the token identifier, as shown in step 1516.

Figure 16:
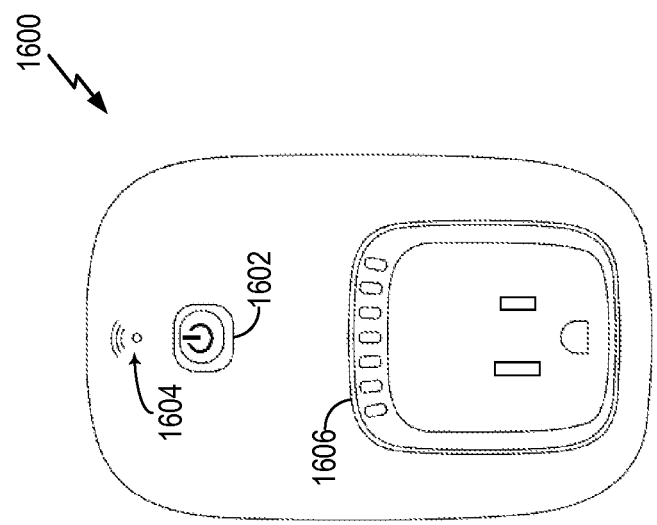
FIG. 16 is an illustration of an example of a front view of a network device, in accordance with an embodiment.
Figure 17:
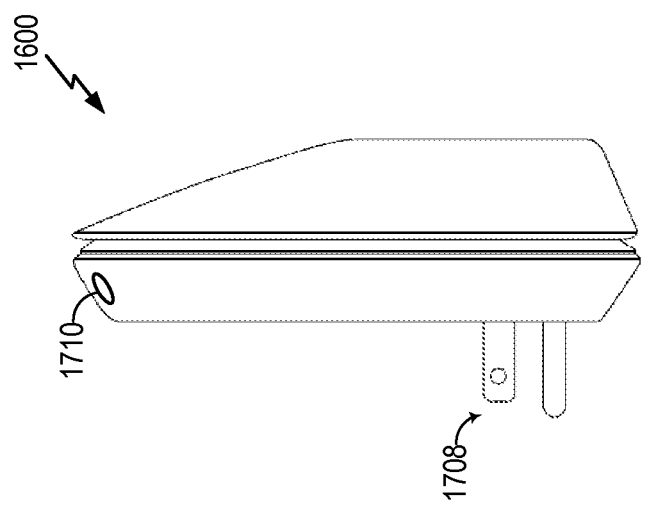
FIG. 17 is an illustration of an example of a side view of a network device, in accordance with an embodiment.

FIG. 16 illustrates an example of a front view of a network device 1600. FIG. 17 illustrates an example of a side view of the network device 1600. The network device 1600 may include any of the network devices 102, 104, or 106 described herein. In some embodiments, the network device 1600 may be a home automation network device. For example, the network device 1600 may include a home automation switch that may be coupled with a home appliance. A user may wirelessly access the network device 1600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1600 may include a WiFi enabled switch that connects home appliances and other electronic devices to a compatible 802.11b/g/n/ac WiFi network. The network device 1600 may thus allow users to locally or remotely turn devices on or off from anywhere, program customized notifications, and/or change device status. The network device 1600 may further allow a user to create custom schedules or have devices respond to sunrise or sunset.

The network device 1600 includes an power switch 1602 that may be depressed in order to turn the network device 1600 on and off. In some embodiments, a light source may be integrated with or located behind the power switch. For example, a light-emitting diode (LED) may be located on a circuit board under the power button 1602. The light source may be illuminated when the network device 1600 is powered on, and may not be illuminated when the network device 1600 is powered off.

The network device 1600 further includes a communications signal indicator 1604. The signal indicator 1604 may indicate whether the network device 1600 has access to a communications signal, such as a WiFi signal. For example, the signal indicator 1604 may include a light source (e.g., a LED) that illuminates when the network device 1600 is connected to a communications signal. The light source may depict different colors or other characteristics (e.g., flashing, dimming, or the like) to indicate different levels of signal strength or mode of operation.

The network device 1600 includes a restore button 1710. The restore button 1710 may allow a user to reset the network device 1600 to factory default settings. For example, upon being depressed, the restore button 1710 may cause all software on the device to be reset to the settings that the network device 1600 included when purchased from the manufacturer.

The network device 1600 further includes a plug 1708 and an outlet 1606. The plug 1708 allows the network device 1600 to be plugged into a wall socket, such as a socket providing 120V, 220V, or the like. In turn, an appliance may be plugged into the outlet 1606. Once the network device 1600 is registered according to the techniques described above, an appliance plugged into the socket 1606 may be controlled by a user using an access device (e.g., access device 108).

Figure 18:
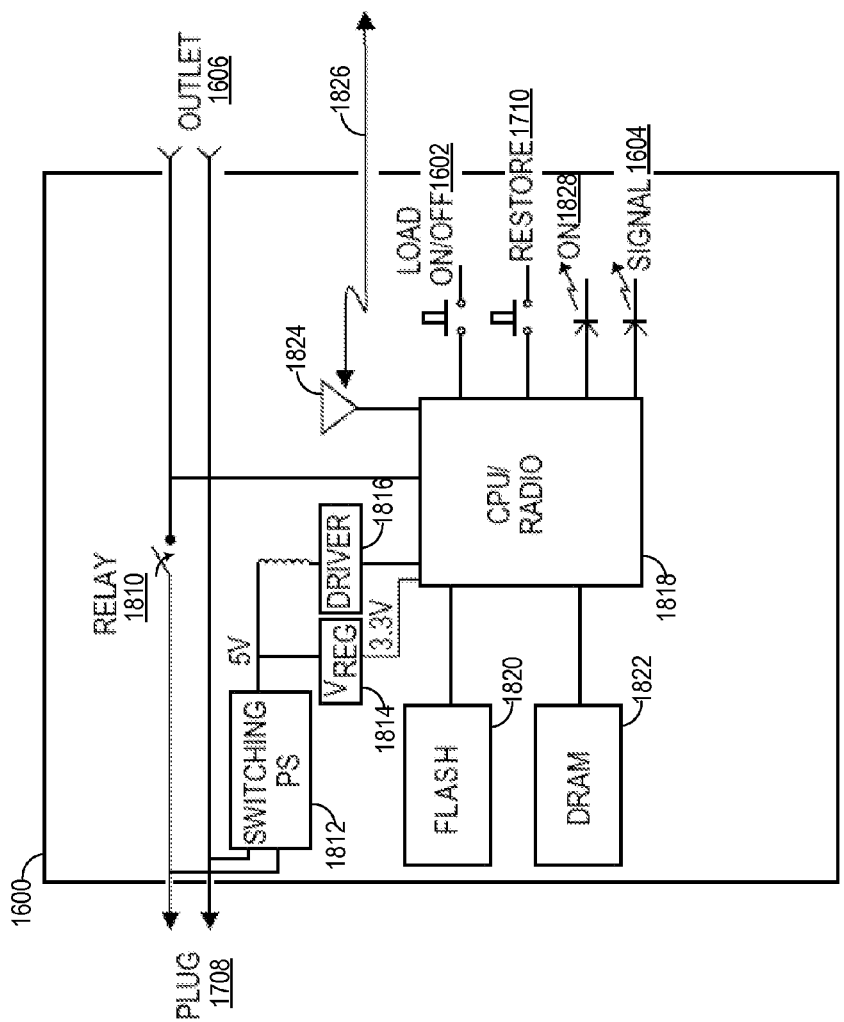
FIG. 18 is an example of a block diagram of a network device, in accordance with an embodiment.

FIG. 18 is an example of a block diagram of the network device 1600 depicting different hardware and/or software components of the network device 1600. As described above with respect to FIGS. 16 and 17, the network device 1600 includes the outlet 1606, the plug 1708, the power button 1602, the restore button 1710, and the communications signal indicator 1604. The network device 1600 also includes light source 1828 associated with the power button 1602. As previously described, the light source 1828 may be illuminated when the network device 1600 is powered on.

The network device 1600 further includes a relay 1810. The relay 1810 is a switch that controls whether power is relayed from the plug 1708 to the outlet 1606. The relay 1810 may be controlled either manually using the power button 1602 or remotely using wireless communication signals. For example, when the power button 1602 is in an ON position, the relay 1810 may be closed so that power is relayed from the plug 1708 to the outlet 1606. When the power button 1602 is in an OFF position, the relay 1810 may be opened so that current is unable to flow from the plug 1708 to the outlet 1606. As another example, an application or program running on an access device may transmit a signal that causes the relay 1810 to be opened or closed. For instance, an access application may display a graphical interface on the access device that includes a power button. The user may tap or otherwise select the power button, and the access application may send a communication signal (e.g., over a WiFi network) to the network device 1600 instructing the network device 1600 to open or close the relay 1810.

The network device 1600 further includes flash memory 1820 and dynamic random access memory (DRAM) 1822. The flash memory 1820 may be used to store instructions or code relating to an operating system, one or more applications, and any firmware. The flash memory 1820 may include nonvolatile memory so that any firmware or other program can be can updated. In the event the network device 1600 loses power, information stored in the flash memory 1820 may be retained. The DRAM 1822 may store various other types of information needed to run the network device 1600, such as all runtime instructions or code.

The network device 1600 further includes a CPU/Radio 1818. The CPU/Radio 1818 controls the operations of the network device 1600. For example, the CPU/Radio 1818 may execute various applications or programs stored in the flash memory 1820 and/or the dynamic random access memory (DRAM) 1822. The CPU/Radio 1818 may also receive input from the various hardware and software components, interpret the input, and perform one or more functions in response to the input. As one example, the CPU/Radio 1818 may determine whether the power button 1602 has been pressed, and determines whether the relay 1810 needs to be opened or closed. The CPU/Radio 1818 may further perform all communications functions in order to allow the network device 1600 to communicate with other network devices, one or more gateways, a cloud network, and/or one or more access devices. While the CPU and radio of the network device 1600 are shown to be combined in the CPU/Radio 1818, one of ordinary skill in the art will appreciate that, in some embodiments, the CPU and radio may be separately located within the network device 1600. For example, CPU circuitry may be situated at a separate location on a circuit board from the location of radio circuitry, the CPU circuitry may be located on a different circuit board from the radio circuitry, or the like. Further, the network device 1600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 1600 does not include a cellular network transceiver radio or interface, and thus may not be configured to directly communicate with a cellular network. In some embodiments, the network device 1600 may include a cellular network transceiver radio, and may be configured to communicate with a cellular network using the cellular network transceiver radio.

The network device 1600 may communicate with other devices and/or networks via antenna 1824. For example, antenna 1824 may include a 2.4 GHz antenna, a 5 GHz antenna, or the like, that can transmit and receive WiFi communications signals. The network device 1600 may include other types of antennas that can communicate Bluetooth® signals, Zigbee® signals, Ultra-Wideband (UWB) signals, WiFi-Direct signals, BLE signals, and/or the like. In some embodiments, the antenna 1824 may be configured to communicate different types of signals, such as the WiFi signals, Bluetooth® signals, Zigbee® signals, UWB signals, WiFi-Direct signals, BLE signals, and/or the like. In some embodiments, the network device 1600 may include multiple antennas for communicating the different types of communication signals. As one example, the network device 1600 may include both a 2.4 GHz antenna and a 5 GHz antenna.

The network device 1600 further includes a driver 1816, a switching power supply 1812, and a voltage regulator 1814. The driver 1816 may include instructions or code that can be used to translate control signals or commands received from applications running on the DRAM 1822 to commands that the various hardware components in the network device 1600 can understand. In some embodiments, the driver 1816 may include an ambient application running on the DRAM 1822. The switching power supply 1812 may be used to transfer power from the outlet in which the plug 1708 is connected to the various loads of the network device 1600 (e.g., CPU/Radio 1818). The switching power supply 1812 may efficiently convert the voltage and current characteristics of the electrical power to a level that is appropriate for the components of the network device 1600. For example, the switching power supply 1812 may perform AC-DC conversion. In some embodiments, the switching power supply 1812 may be used to control the power that is relayed from the plug 1708 to the outlet 1606. The voltage regulator 1814 may be used to convert the voltage output from the switching power supply 1812 to a lower voltage usable by the CPU/Radio 1818. For example, the voltage regulator 1814 may regulate the DC voltage from 5V to 3.3V.

In various embodiments, functions may be stored as one or more computer-program products, such as instructions or code, in a non-transitory machine-readable storage medium, such as the flash memory 1820 and/or the DRAM 1822. The network device 1600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 1820 and/or the DRAM 1822, may be a processor-readable memory and/or a computer-readable memory that stores software code (programming code, instructions, etc.) configured to cause a processor(s) within the CPU/Radio 1818 to perform the functions described. In other embodiments, one or more of the functions described may be performed in hardware.

A set of these instructions and/or code might be stored on a non-transitory machine-readable storage medium, such as the flash memory 1820 and/or the DRAM 1822. In some cases, the storage medium might be incorporated within a computer system, such as the CPU/Radio 1818. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1600 and/or might take the form of source and/or installable code, which, upon compilation and/or installation on the network device 1600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1600 may have other components than those depicted in FIGS. 16-18. Further, the embodiment shown in the figures are only one example of a network device that may incorporate an embodiment of the invention. In some other embodiments, network device 1600 may have more or fewer components than shown in the figure, may combine two or more components, or may have a different configuration or arrangement of components.

Figure 19:
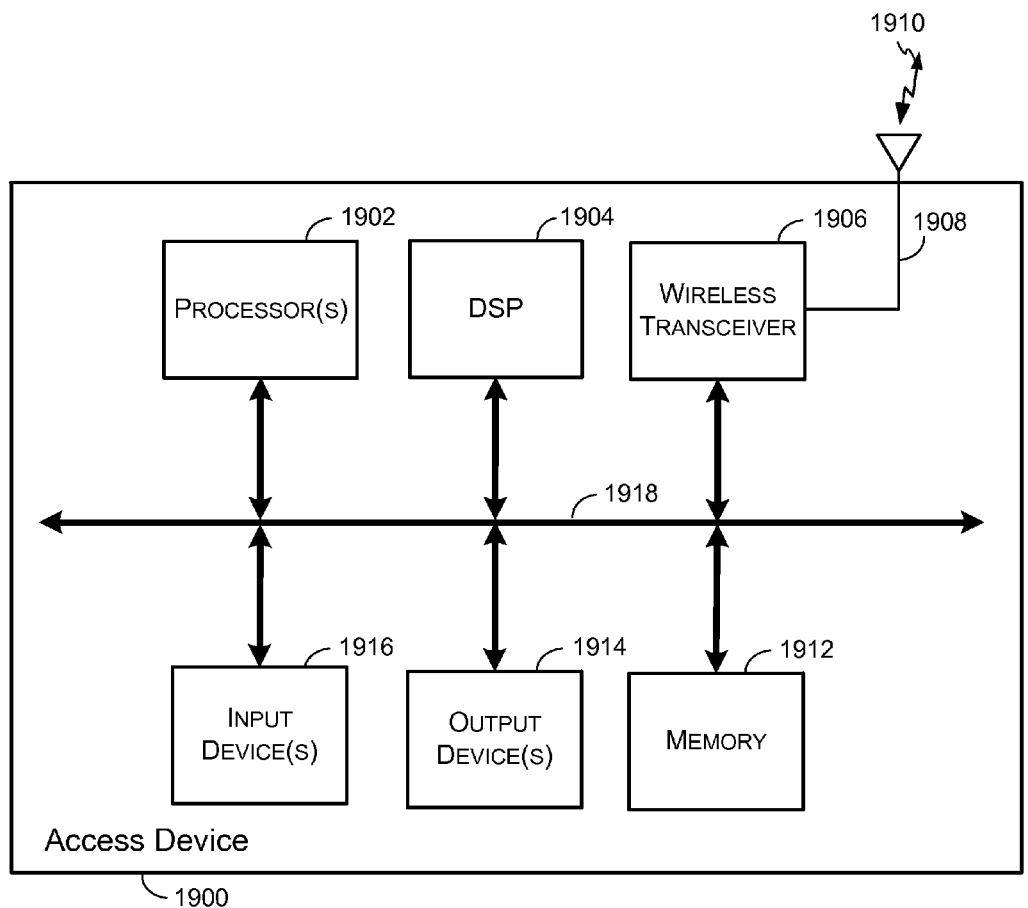
FIG. 19 is a block diagram illustrating an example of an access device, in accordance with some embodiments.

FIG. 19 illustrates an example of an access device 1900. The access device 1900 may include any human-to-machine interface with network connection capability that allows access to a network. For example, the access device 1900 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1900 includes hardware elements that can be electrically coupled via a bus 1918 (or may otherwise be in communication, as appropriate). In one embodiment, the bus 1918 can be used for the processor(s) 1902 to communicate between cores and/or with the memory 1912. The hardware elements may include one or more processors 1902, including without limitation one or more general-purpose processors and/or one or more special-purpose processors (such as digital signal processing chips, graphics acceleration processors, and/or the like); one or more input devices 1916, which can include without limitation a camera, a mouse, a keyboard, a touch sensitive screen, a touch pad, a keypad, and/or the like; and one or more output devices 1914, which can include, without limitation, a display, a printer, and/or the like.

The access device 1900 may include one or more wireless transceivers 1906 connected to the bus 1918. The wireless transceiver 1906 may be operable to receive wireless signals (e.g., signal 1910) via antenna 1908. The wireless signal 1910 may be transmitted via a wireless network. In some embodiments, the wireless network may be any wireless network such as a wireless local area network (e.g., local area network 100), such as WiFi, a Personal Access Network (PAN), such as Bluetooth®, Zigbee®, or UWB, or a cellular network (e.g. a GSM, WCDMA, LTE, CDMA2000 network). Wireless transceiver 1906 may be configured to receive various radio frequency (RF) signals (e.g., signal 1910) via antenna 1908 from one or more gateways, network devices, other access devices, cloud networks, and/or the like. Access device 1900 may also be configured to decode and/or decrypt, via the DSP 1904 and/or processor(s) 1902, various signals received from one or more gateways, network devices, other access devices, cloud networks, and/or the like.

The access device 1900 may further include (and/or be in communication with) one or more non-transitory machine-readable storage mediums or storage devices (e.g., memory 1912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1912, such as RAM, ROM, FLASH, or disc drive, and executed by processor(s) 1902 or DSP 1904. The access device 1900 can also comprise software elements (e.g., located within the memory 1912), including, for example, an operating system, device drivers, executable libraries, and/or other code, such as one or more application programs, which may comprise computer programs implementing various functions. Memory 1912 may be a non-transitory machine-readable storage medium, processor-readable memory, and/or a computer-readable memory that stores the one or more computer-program products configured to cause the processor(s) 1902 and/or DSP 1904 to perform the various functions. In other embodiments, the various functions described may be performed in hardware.

Figure 20:
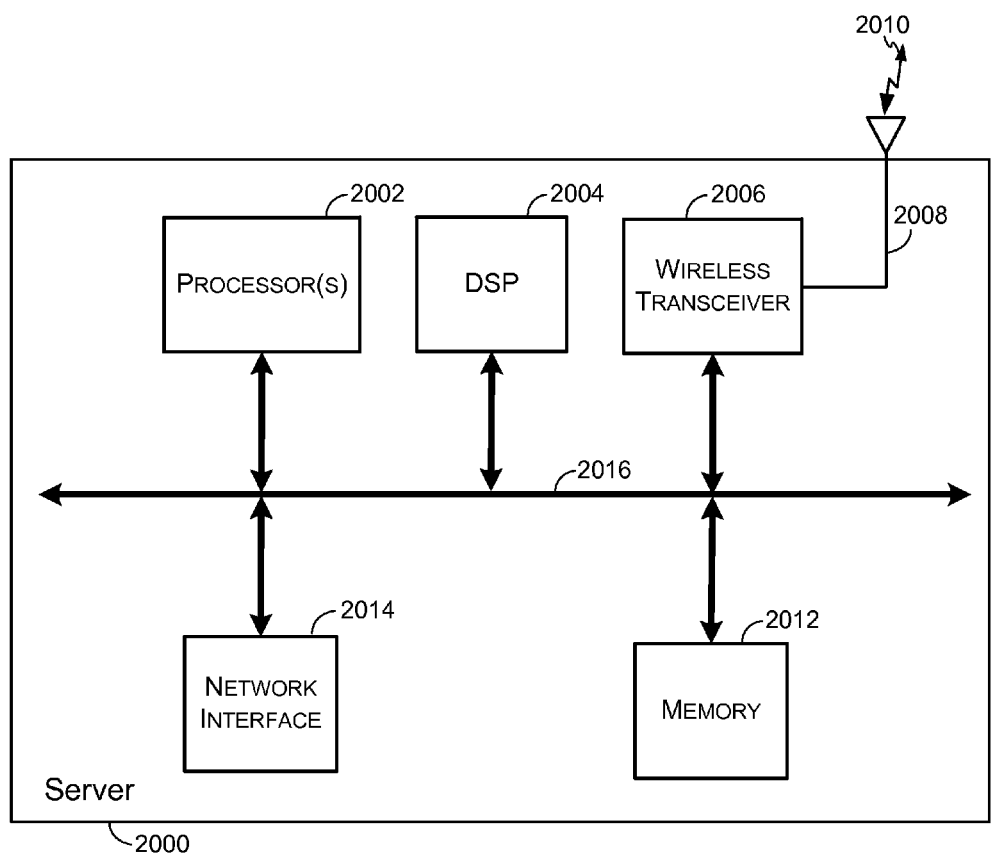
FIG. 20 is a block diagram illustrating an example of a server, in accordance with some embodiments.

FIG. 20 illustrates an example of a server 2000. The server 2000 includes hardware elements that can be electrically coupled via a bus 2016 (or may otherwise be in communication, as appropriate). In one embodiment, the bus 2016 can be used for the processor(s) 2002 to communicate between cores and/or with the memory 2012. The hardware elements may include one or more processors 2002, including without limitation one or more general-purpose processors and/or one or more special-purpose processors (such as digital signal processing chips, graphics acceleration processors, and/or the like), memory 2012, DSP 2004, a wireless transceiver 2006, a bus 2016, and antenna 2008. Furthermore, in addition to the wireless transceiver 2006, server 2000 can further include a network interface 2014 to communicate with a network (e.g., a local area network, a network of a preferred carrier, Internet, etc.).

The server 2000 may further include (and/or be in communication with) one or more non-transitory machine-readable storage mediums or storage devices (e.g., memory 2012), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2012. The server 2000 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 2012 may be a non-transitory machine-readable storage medium, processor-readable memory, and/or a computer-readable memory that stores the one or more computer-program products configured to cause the processor(s) 2002 to perform the functions described. In other embodiments, one or more of the functions described may be performed in hardware.

A set of these instructions and/or code might be stored on a non-transitory machine-readable storage medium, such as the memory 2012. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 2000 and/or might take the form of source and/or installable code, which, upon compilation and/or installation on the server 2000 (e.g., using any of a variety of generally available compilers, installation programs, compression/decompression utilities, etc.) then takes the form of executable code.

Figure 21:
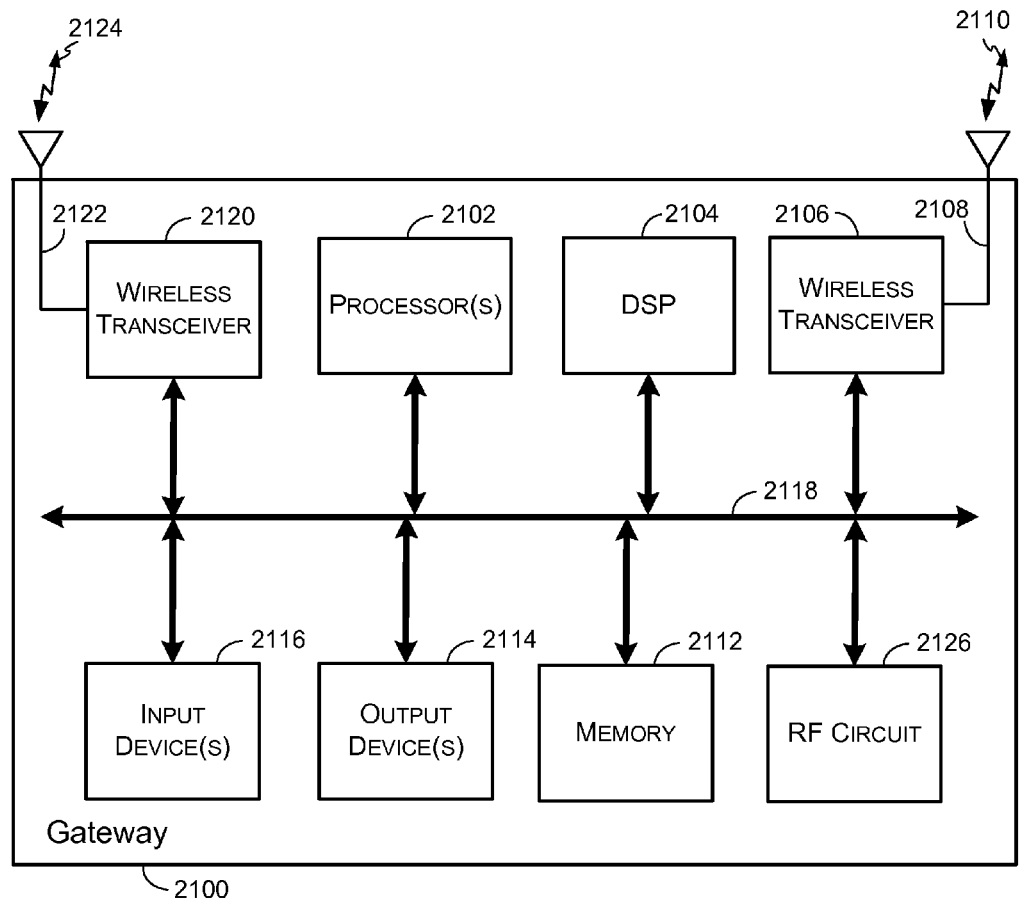
FIG. 21 is a block diagram illustrating an example of a gateway, in accordance with some embodiments.

FIG. 21 illustrates an example of a gateway 2100. The gateway 2100 may include a range extending device, a router, an access point, a modem, and/or any other device that provides network access among one or more computing devices and/or external networks. For example, the gateway 2100 may include a router gateway with access point and router functionality, and may further include an Ethernet switch and/or a modem. As another example, the gateway 2100 may include a range extending gateway that may be used to improve signal range and strength within a network by taking an existing signal from another gateway (e.g., a router gateway, an access point, or the like) and rebroadcasting the signal to create a second logical network.

The gateway 2100 includes hardware elements that can be electrically coupled via a bus 2118 (or may otherwise be in communication, as appropriate). In one embodiment, the bus 2118 can be used for the processor(s) 2102 to communicate between cores and/or with the memory 2112. The hardware elements may include one or more processors 2102, including without limitation one or more general-purpose processors and/or one or more special-purpose processors (such as digital signal processing chips, graphics acceleration processors, and/or the like); one or more input devices 2116, which can include without limitation one or more buttons, a keyboard, a keypad, a touch sensitive screen, a touch pad, and/or the like; and one or more output devices 2114, which can include, without limitation, a display, light or sound indicators, and/or the like.

The gateway 2100 may include one or more wireless transceivers 2106 and 2120 connected to the bus 2118. The wireless transceiver 2106 may be operable to receive wireless signals (e.g., a wireless signal 2110) via an antenna 2108. The wireless transceivers 2120 may be operable to receive wireless signals (e.g., a wireless signal 2114) via an antenna 2122. The wireless transceivers 2106 and 2120 may each include a WiFi transceiver radio designed to transmit and receive signals using frequencies of a specific frequency band, which may be referred to herein as "WiFi circuits." For example, wireless transceiver 2106 may include a 2.4 GHz WiFi circuit, and wireless transceiver 2120 may include a 5 GHz WiFi circuit. Accordingly, the gateway 2100 may include a single WiFi circuit for a first WiFi frequency band, and a single WiFi circuit for a second WiFi frequency band. In some embodiments, the gateway 2100 may include multiple wireless transceivers (not shown) for each available frequency band. The antennas 2108 and 2122 may include multiple band antennas that can transmit and/or receive signals over different frequency bands.

The gateway 2100 may further include radio frequency (RF) circuit 2126. In some embodiments, the wireless transceivers 2106 and 2120 may be integrated with or coupled to the RF circuit 2126 so that the RF circuit 2126 includes the wireless transceivers 2106 and 2120. In some embodiments, the wireless transceivers 2106 and 2120 and the RF circuit 2126 are separate components. The RF circuit 2126 may include a RF amplifier that may amplify signals received over antennas 2108 and 2122. The RF circuit 2126 may also include a power controller that may be used to adjust signal amplification by the RF amplifier. The power controller may be implemented using hardware, firmware, software, or any combination thereof.

The wireless signals 2110 and 2124 may be transmitted via a wireless network. In some embodiments, the wireless network may be any wireless network such as a wireless local area network (e.g., local area network 100), such as WiFi™, a Personal Access Network (PAN), such as Bluetooth®, Zigbee®, or UWB, or a cellular network (e.g. a GSM, WCDMA, LTE, CDMA2000 network). Wireless transceivers 2106 and 2120 may be configured to receive various radio frequency (RF) signals (e.g., signals 2110 and 2124) via antennas 2108 and 2124, respectively, from one or more other gateways, access devices, network devices, cloud networks, and/or the like. Gateway 2100 may also be configured to decode and/or decrypt, via the DSP 2104 and/or processor(s) 2102, various signals received from one or more gateways, network devices, cloud networks, and/or the like.

The gateway 2100 may include a power supply (not shown) that can power the various components of the gateway 2100. The power supply may include a switch-mode power supply, a linear power supply, a push-pull power supply, or any other suitable type of power supply. In some embodiments, the gateway 2100 may include multiple power supplies. For example, a switch-mode power supply may be used to condition input power, and a linear power supply may be used to power the RF circuit 2126. The power supply may be configured to operate over various ranges of appropriate input voltages.

The gateway 2100 may further include (and/or be in communication with) one or more non-transitory machine-readable storage mediums or storage devices (e.g., memory 2112), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2112, such as RAM, ROM, FLASH, or disc drive, and executed by processor(s) 2102 or DSP 2104. The gateway 2100 can also comprise software elements (e.g., located within the memory 2112), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 14 and 15, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 14 and 15. The memory 2112 may be a non-transitory machine-readable storage medium, processor-readable memory, and/or a computer-readable memory that stores the one or more computer-program products configured to cause the processor(s) 2102 to perform the functions described. In other embodiments, one or more of the functions described may be performed in hardware.

A set of these instructions and/or code might be stored on a non-transitory machine-readable storage medium, such as the memory 2112. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 2100 and/or might take the form of source and/or installable code, which, upon compilation and/or installation on the gateway 2100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer implemented method, comprising:
   establishing, at an access device on a network, a communication connection with a setup access point of a network device on the network, wherein the setup access point is generated by the network device;
   generating, by the access device, a token identifier, wherein the token identifier includes identification data corresponding to the access device to allow the network device to locate the access device, and wherein the token identifier facilitates re-establishing a communication connection between the access device and the network device after a disconnection;
   transmitting, by the access device, the token identifier;
   detecting, by the access device, that the communication connection between the access device and the network device has been terminated;
   transmitting, by the access device, a query, wherein the query includes a request to establish a new communication connection with the setup access point of the network device after the communication connection is terminated, and wherein when the query is received, the establishing of the new communication is facilitated by a gateway on the network using the token identifier; and
   receiving, at the access device, a communication including a response to the query, wherein the response indicates that the new communication connection has been established with the setup access point of the network device, and wherein the new communication connection is established using the token identifier.

2. The method of claim 1, wherein establishing a communication connection with the setup access point includes transmitting credentials identifying the network.

3. The method of claim 1, wherein the communication connection is established on a channel and the new communication connection is established on a new channel, wherein the channel is different than the new channel.

4. The method of claim 1, further comprising:
   storing the token identifier; and
   deleting the token identifier from storage after a predetermined period of time.

5. The method of claim 4, wherein the token identifier is stored in storage in the access device.

6. The method of claim 4, wherein the token identifier is stored in storage on an external network.

7. The method of claim 1, wherein the identification data includes a location of the access device.

8. The method of claim 1, further comprising:
   transmitting a request to connect to the setup access point.

9. The method of claim 1, wherein detecting that the communication connection between the access device and the network device has been terminated includes receiving a communication including an indication that the connection is terminated.

10. The method of claim 1, further comprising:
    transmitting the token identifier to the setup access point.

11. A computing device, comprising:
    one or more processors; and
    a memory having instructions stored thereon, which when executed by the one or more processors, cause the computing device to perform operations including:
    establishing, at an access device on a network, a communication connection with a setup access point of a network device on the network, wherein the setup access point is generated by the network device;
    generating, by the access device, a token identifier, wherein the token identifier includes identification data corresponding to the access device to allow the network device to locate the access device, and wherein the token identifier facilitates re-establishing a communication connection between the access device and the network device after a disconnection;
    transmitting, by the access device, the token identifier;
    detecting, by the access device, that the communication connection between the access device and the network device has been terminated;
    transmitting, by the access device, a query, wherein the query includes a request to establish a new communication connection with the setup access point of the network device after the communication connection is terminated, and wherein when the query is received, the establishing of the new communication is facilitated by a gateway on the network using the token identifier; and
    receiving, at the access device, a communication including a response to the query, wherein the response indicates that the new communication connection has been established with the setup access point of the network device, and wherein the new communication connection is established using the token identifier.

12. The computing device of claim 11, wherein establishing a communication connection with the setup access point includes transmitting credentials identifying the network.

13. The computing device of claim 11, wherein the communication connection is established on a channel and the new communication connection is established on a new channel, wherein the channel is different than the new channel.

14. The computing device of claim 11, further comprising instructions, which when executed by the one or more processors, cause the computing device to perform operations including:
    storing the token identifier; and
    deleting the token identifier from storage after a predetermined period of time.

15. The computing device of claim 11, wherein the identification data includes a location of the computing device.

16. The computing device of claim 15, wherein the token identifier is stored in storage in the computing device.

17. The computing device of claim 15, wherein the token identifier is stored in storage on an external network.

18. The computing device of claim 11, further comprising instructions, which when executed by the one or more processors, cause the computing device to perform operations including:
    transmitting a request to connect to the setup access point.

19. The computing device of claim 11, further comprising instructions, which when executed by the one or more processors, cause the computing device to perform operations including:
receiving a communication including an indication that the connection is terminated.

20. The computing device of claim 11, further comprising instructions, which when executed by the one or more processors, cause the computing device to perform operations including:
transmitting the token identifier to the setup access point.

21. A non-transitory computer-readable storage medium having instructions stored thereon, which when executed by a computing device, cause the computing device to:
establish, at an access device on a network, a communication connection with a setup access point of a network device on the network, wherein the setup access point is generated by the network device;
generate, by the access device, a token identifier, wherein the token identifier includes identification data corresponding to the access device to allow the network device to locate the access device, and wherein the token identifier facilitates re-establishing a communication connection between the access device and the network device after a disconnection;
transmit, by the access device, the token identifier;
detect, by the access device, that the communication connection between the access device and the network device has been terminated;
transmit, by the access device, a query, wherein the query includes a request to establish a new communication connection with the setup access point of the network device after the communication connection is terminated, and wherein when the query is received, the establishing of the new communication is facilitated by a gateway on the network using the token identifier; and
receive, at the access device, a communication including a response to the query, wherein the response indicates that the new communication connection has been established with the setup access point of the network device, and wherein the new communication connection is established using the token identifier.

22. The non-transitory computer-readable storage medium of claim 21, wherein establishing a communication connection with the setup access point includes transmitting credentials identifying the network.

23. The non-transitory computer-readable storage medium of claim 21, wherein the communication connection is established on a channel and the new communication connection is established on a new channel, wherein the channel is different than the new channel.

24. The non-transitory computer-readable storage medium of claim 21, further comprising instructions configured to cause the data processing apparatus to:
store the token identifier; and
delete the token identifier from storage after a predetermined period of time.

25. The non-transitory computer-readable storage medium of claim 21, wherein the identification data includes a location of the computing device.

26. The non-transitory computer-readable storage medium of claim 25, wherein the token identifier is stored in storage in the computing device.

27. The non-transitory computer-readable storage medium of claim 25, wherein the token identifier is stored in storage on an external network.

28. The non-transitory computer-readable storage medium of claim 21, further comprising instructions configured to cause the data processing apparatus to:
transmit a request to connect to the setup access point.

29. The non-transitory computer-readable storage medium of claim 21, further comprising instructions configured to cause the data processing apparatus to:
receive a communication including an indication that the connection is terminated.

30. The non-transitory computer-readable storage medium of claim 21, further comprising instructions configured to cause the data processing apparatus to:
transmit the token identifier to the setup access point.

\* \* \* \* \*